United States Patent
Kohira et al.

(10) Patent No.: US 12,272,829 B2
(45) Date of Patent: *Apr. 8, 2025

(54) BATTERY

(71) Applicant: PANASONIC INTELLECTUAL PROPERTY MANAGEMENT CO., LTD., Osaka (JP)

(72) Inventors: Kazutoshi Kohira, Hyogo (JP); Keisuke Naito, Osaka (JP); Shinya Geshi, Osaka (JP); Hiroshi Takasaki, Osaka (JP); Kazumichi Shimizu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 683 days.

This patent is subject to a terminal disclaimer.

(21) Appl. No.: 17/298,412

(22) PCT Filed: Nov. 29, 2019

(86) PCT No.: PCT/JP2019/046918
§ 371 (c)(1),
(2) Date: May 28, 2021

(87) PCT Pub. No.: WO2020/111275
PCT Pub. Date: Jun. 4, 2020

(65) Prior Publication Data
US 2022/0123395 A1    Apr. 21, 2022

(30) Foreign Application Priority Data

Nov. 30, 2018  (JP) .................................. 2018-225881
Nov. 30, 2018  (JP) .................................. 2018-225882

(Continued)

(51) Int. Cl.
*H01M 50/107*    (2021.01)
*H01M 50/147*    (2021.01)
(Continued)

(52) U.S. Cl.
CPC ....... *H01M 50/107* (2021.01); *H01M 50/147* (2021.01); *H01M 50/152* (2021.01);
(Continued)

(58) Field of Classification Search
CPC ............. H01M 50/107; H01M 50/152; H01M 50/184; H01M 50/186; H01M 50/147; H01M 10/283; H01M 10/285
See application file for complete search history.

(56) References Cited

U.S. PATENT DOCUMENTS 2,332,456 A * 10/1943 McEachron ........ H01M 50/182
                                                            429/169
3,061,660 A * 10/1962 Schenk, Jr. ......... H01M 50/154
                                                            429/174
(Continued)

FOREIGN PATENT DOCUMENTS

JP    S48-062524 U    8/1973
JP    S59-072658 U    5/1984
(Continued)

OTHER PUBLICATIONS

International search report and Written Opinion issued in International Patent Application No. PCT/JP2019/046918, dated Feb. 10, 2020; with partial English translation.

*Primary Examiner* — Matthew T Martin
*Assistant Examiner* — Jessie Walls-Murray
(74) *Attorney, Agent, or Firm* — Rimon P.C.

(57) ABSTRACT

A battery including: a battery can including a cylinder portion including an opening edge portion at one end portion of the cylinder portion and a bottom portion that closes the
(Continued)

other end portion of the cylinder portion; an electrode body; a sealing member that seals an opening of the opening edge portion. The sealing member includes: a sealing plate; a cap connected to the sealing plate and electrically insulated from the sealing plate; and a sealing portion sealing a space between the cylinder portion and the cap. The cap includes: a ring-shaped top plate portion opposing the opening edge portion in an axial direction of the cylinder portion; and a side wall portion covering an outer circumferential surface of the cylinder portion. The sealing portion may be a gasket provided between the cap and the cylinder portion in a compressed state. The cap is electrically connected to the cylinder portion.

9 Claims, 33 Drawing Sheets

(30) Foreign Application Priority Data

Nov. 30, 2018 (JP) .................................. 2018-225883
Nov. 30, 2018 (JP) .................................. 2018-225885

(51) Int. Cl.
*H01M 50/152* (2021.01)
*H01M 50/184* (2021.01)
*H01M 50/186* (2021.01)
*H01M 50/593* (2021.01)
*H01M 6/02* (2006.01)
*H01M 10/02* (2006.01)

(52) U.S. Cl.
CPC ....... *H01M 50/184* (2021.01); *H01M 50/186* (2021.01); *H01M 50/593* (2021.01); *H01M 6/02* (2013.01); *H01M 10/02* (2013.01)

(56) References Cited

U.S. PATENT DOCUMENTS

| | | | | |
|---|---|---|---|---|
| 3,494,801 | A * | 2/1970 | Urry | ................... H01M 50/317 |
| | | | | 429/185 |
| 2019/0267583 | A1* | 8/2019 | Masumoto | .......... H01M 50/147 |
| 2020/0083494 | A1* | 3/2020 | Bae | ....................... H01M 50/55 |
| 2020/0365839 | A1* | 11/2020 | Kim | ................. H01M 10/0422 |
| 2021/0175566 | A1* | 6/2021 | Okutani | ............... H01M 50/166 |
| 2023/0044229 | A1* | 2/2023 | Lin | ..................... H01M 50/169 |
| 2023/0216116 | A1* | 7/2023 | Liu | ..................... H01M 50/169 |
| | | | | 429/94 |

FOREIGN PATENT DOCUMENTS

| | | |
|---|---|---|
| JP | S64-005360 U | 1/1989 |
| JP | H07-105933 A | 4/1995 |
| WO | 2017/223429 A1 | 12/2017 |

* cited by examiner

BATTERY

CROSS-REFERENCE OF RELATED APPLICATIONS

This application is the U.S. National Phase under 35 U.S.C. § 371 of International Patent Application No. PCT/JP2019/046918, filed on Nov. 29, 2019, which in turn claims the benefit of Japanese Application Nos. 2018-225881, 2018-225882, 2018-225883, and 2018-225885, all filed on Nov. 30, 2018, the entire disclosures of which applications are incorporated by reference herein.

TECHNICAL FIELD

The present invention relates to a battery.

BACKGROUND ART

As a method for sealing an opening of a battery can after an electrode body is housed into the battery can, a method as disclosed in Patent Literature 1 is known in which an annular groove is formed by recessing the vicinity of the opening of the battery case (battery can) inward, thereafter, a gasket and a sealing plate are placed on an upper portion of the groove portion, and a crimp portion is formed by crimping an opening end portion of the battery case onto the sealing plate with the gasket interposed therebetween.

CITATION LIST

Patent Literature

[PTL 1] Laid-Open Patent Publication No. H07-105933

SUMMARY OF INVENTION

Technical Problem

However, in the battery that includes the groove portion and the crimp portion, a sealing member is placed on the groove portion and the crimp portion is formed on the sealing member with the gasket interposed therebetween, and thus the dimension in the height direction of the battery tends to be large in the vicinity of the sealing plate. Accordingly, there is a limitation on increasing the energy density of the battery.

Solution to Problem

An aspect of the present invention relates to a battery including: a battery can and a bottom portion, the cylinder portion having an opening edge portion at one of end portions of the cylinder portion, the other one of the end portions of the cylinder portion being closed by the bottom portion; an electrode body that is housed in the cylinder portion; and a sealing member that is fixed to the cylinder portion to seal an opening of the opening edge portion, wherein the sealing member includes: a sealing plate; a cap that has a through hole corresponding to the sealing plate and is connected to the sealing plate while being electrically insulated from the sealing plate; and a sealing portion that seals a space between the cylinder portion and the cap, with a direction in which the two end portions of the cylinder portion face each other being defined as an axial direction, the cap includes: a ring-shaped top plate portion that is disposed to oppose the opening edge portion in the axial direction and lie along a circumferential edge of the sealing plate; and a side wall portion that extends from a circumferential edge of the top plate portion toward the bottom portion and covers an outer circumferential surface of the cylinder portion, the battery can is electrically connected to one of electrodes included in the electrode body, the sealing plate is electrically connected to the other one of the electrodes included in the electrode body, and the cap is electrically connected to the cylinder portion.

Advantageous Effects of Invention

According to the present invention, it is possible to easily achieve a battery with a high energy density in which a height reduction is easily achieved.

Novel features of the present invention are set forth in the appended claims. However, the configuration and details of the present invention, as well as other objects and features of the present invention, will be further understood with reference to the following detailed description and the accompanying drawings.

DESCRIPTION OF EMBODIMENTS

Figure 1:
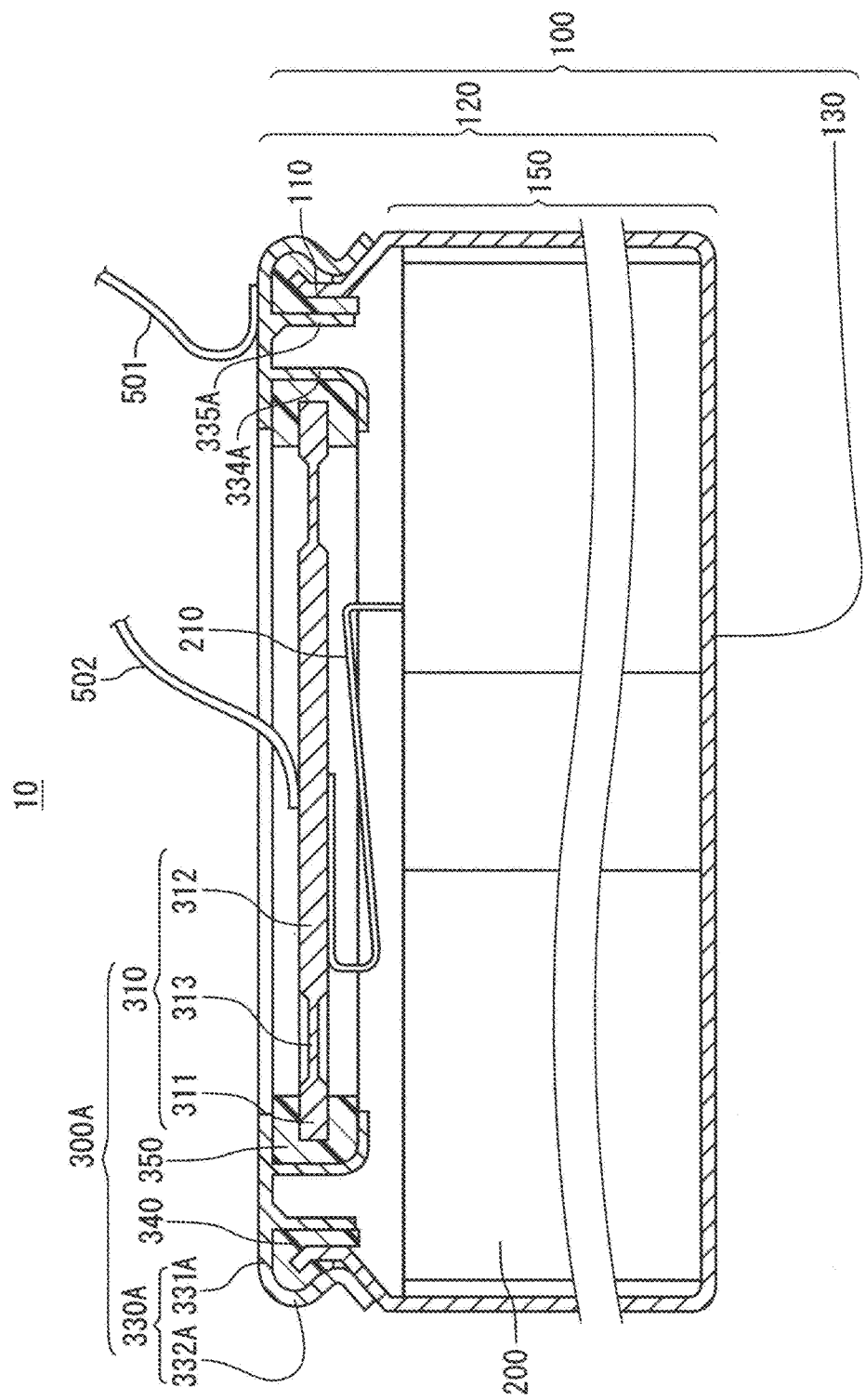
FIG. 1 is a schematic vertical cross sectional view showing an embodiment of a battery according to a first aspect of the present disclosure.

A battery according to the present disclosure includes: a battery can that includes a cylinder portion that includes an opening edge portion at one end portion of the cylinder portion and a bottom portion that closes the other end portion of the cylinder portion; an electrode body that is housed in the cylinder portion; and a sealing member that is fixed to the cylinder portion to seal an opening of the opening edge portion. The sealing member includes: a sealing plate; a cap that has a through hole corresponding to the sealing plate and is connected to the sealing plate while being electrically insulated from the sealing plate; and a sealing portion that seals a space between the cylinder portion and the cap. The cap includes: a ring-shaped top plate portion that is disposed to oppose the opening edge portion in an axial direction of the cylinder portion and lie along a circumferential edge of the sealing plate; and a side wall portion that extends from an outer circumferential edge of the top plate portion toward the bottom portion and covers an outer circumferential surface of the cylinder portion.

Here, a direction in which two end portions of the cylinder portion face each other is defined as the axial direction. For the sake of convenience, a direction from the sealing plate toward the electrode body (or a direction from the sealing plate toward the bottom portion of the battery can) is defined as downward direction, and a direction from the electrode body toward the sealing plate (or a direction from the bottom portion of the battery can toward the sealing plate) is defined as upward direction. However, in the battery according to the present invention, the sealing plate does not necessarily need to be disposed above the electrode body. The sealing plate may be disposed below the electrode body, or the bottom portion may be disposed above the electrode body. In general, when a battery can is placed vertically with the bottom portion facing downward, the axial direction of the cylinder portion from the bottom portion toward the opening edge portion is defined as the upward direction. However, the upward direction and the downward direction do not necessarily need to be parallel to the axial direction of the cylinder portion as long as the upward direction and the downward direction extend along the axial direction. A direction from the electrode body toward the sealing plate may also be referred to as "height direction". A direction perpendicular to the axial direction may also be referred to as "radial direction" or "horizontal direction".

Also, the opening edge portion refers to an opening-side end portion of the cylinder portion of the battery can and the vicinity of the opening-side end portion, and specifically, a portion extending from a bottom portion-side end portion of a portion of the cylinder portion that may oppose the sealing member to the opening-side end portion of the cylinder portion.

According to the battery of the present disclosure, it is unnecessary to form a conventional annular groove for placing a sealing plate and a conventional crimp portion formed around the opening edge portion. For this reason, it is possible to reduce the height of the battery and increase the energy density of the battery.

Furthermore, the top plate portion of the cap has a ring shape that includes a substantially flat surface, and is electrically insulated from the sealing plate. The battery can is electrically connected to one of the electrodes included in the electrode body, and the sealing plate is electrically connected to the other one of the electrodes included in the electrode body. At this time, by electrically connecting the side wall portion of the cap to the cylinder portion of the battery can, it is possible to output the voltage of external terminals connected to the battery can from the top plate portion.

In an ordinary battery, the sealing plate functions as an external terminal for one (for example, positive electrode) of the electrodes of the battery, and the battery can function as an external terminal for the other electrode (for example, negative electrode). In the case where an external lead wire is connected to each external terminal, one of the external lead wires is drawn out from the upper surface of the battery, and the other external lead wire is drawn out from the lower surface of the battery. In this case, it is necessary to provide wiring spaces in the up-down direction of the battery.

In contrast, in the battery of the present disclosure, the cap can function as an external terminal for the other electrode connected to the battery can. For this reason, electric current generated in both of the electrodes can be collected from the upper side (sealing plate side) of the battery. Accordingly, it is sufficient to provide a space (wiring space) for lead wires connected to the external terminals only on the sealing plate side, and thus the wiring space can be reduced.

Also, as the top plate portion of the cap, a flat conductive member processed into a ring shape can be used before the battery is assembled. Accordingly, the proportion of the area of the flat portion of the top plate portion can be increased by adjusting the size of the through hole surrounded by the top plate portion to be small. This facilitates the connection of an external lead wire that is connected to the cap. In contrast, in a conventional battery that has a crimp portion, when the crimp portion is drawn from the outer circumference of the battery toward the center axis during the step of sealing the battery, the length of the circumference varies significantly, as a result of which, the crimp portion is easily wrinkled, and it is therefore difficult to ensure the flatness of the crimp portion. Unlike the conventional battery, with the battery of the present disclosure that has the top plate portion, the degree of freedom of connection of external lead wires is significantly improved.

The battery of the present disclosure may be configured as described in, for example, the following first to fourth aspects.

In a non-limiting first aspect, the sealing portion includes a first gasket. The first gasket is provided between the cap and the cylinder portion in a compressed state. As a result, the space between the opening edge portion of the battery can and the sealing member is sealed.

The side wall portion includes, for example, a first engagement portion that is engaged with the cylinder portion. The side wall portion may extend so as to overlap the electrode body with the cylinder portion therebetween, and the first engagement portion may oppose the electrode body with the cylinder portion therebetween.

The space between the cap and the opening edge portion (cylinder portion) and the space between the cap and the sealing plate are sealed by, for example, a gasket. The same gasket (first gasket) may be used to seal the space between the cap and the opening edge portion and the space between the cap and the sealing plate. Alternatively, a first gasket may be used to seal the space between the cap and the opening edge portion, and a second gasket may be used to seal the space between the cap and the sealing plate. The second gasket may be provided between the sealing plate and the cap in a compressed state. In the case where the second gasket is used, the second gasket may be provided spaced apart from the first gasket. The first gasket does not necessarily need to be a molded article as long as sealing is possible. The first gasket may be placed on a surface of one of two members including the cap and the cylinder portion, and supported by the member. Likewise, the second gasket does not necessarily need to be a molded article as long as it is possible to insulate the sealing plate and the cap from each other and seal the space between the sealing plate and the cap. In the case where the space between the cap and the opening edge portion and the space between the cap and the sealing plate are sealed by using the first gasket alone, the space between the cap and the sealing plate can be sealed by, for example, also providing the first gasket between an outer circumferential edge portion of the sealing plate and the top plate portion. Alternatively, insulation and sealing between the sealing plate and the cap may be implemented by applying, instead of the second gasket, an insulating material to an abutting portion where the sealing plate and the cap abut against each other, or by subjecting a surface of one of the two members to insulation processing.

In the case where the second gasket is used, the first gasket and the second gasket may be provided spaced apart from each other so as to provide a gap between the first gasket and the second gasket. As used herein, the expression "to provide a gap between the first gasket and the second gasket" encompasses, for example, the case where the first gasket and the second gasket oppose each other with a gap interposed therebetween. In this case, with the configuration in which a gap is provided between the first gasket and the second gasket, the space for the sealing mechanism of the battery in the height direction can be easily reduced.

In the case where, in order to form the first engagement portion, the side wall portion of the cap is crimped in the horizontal direction that is perpendicular to the axial direction to seal the space between the cap and the opening edge portion, the sealing plate may deform as a result of a force in the horizontal direction being transmitted to the sealing plate via the second gasket. However, by providing a gap between the first gasket and the second gasket, it is possible to prevent the force in the horizontal direction from being transmitted directly to the sealing plate. Accordingly, deformation of the sealing plate can be suppressed.

The cap may include a supporting portion that extends to stand from a surface of the top plate portion that opposes the bottom portion and extends toward the bottom portion in the axial direction. The supporting portion is provided to, for example, fix the second gasket in a compressed state and seal the space between the cap and the sealing plate. In this case, the second gasket may be provided at least between the inner circumferential surface of the supporting portion and the outer circumferential edge portion of the sealing plate. On the other hand, the first gasket may be provided in an outer circumferential region that is located on an outer circumferential side than the supporting portion and includes an outer circumferential end portion of the top plate portion.

The supporting portion may be bent along a circumferential edge of the second gasket to extend inward in the radial direction (horizontal direction) after extending toward the bottom portion in the axial direction. By doing so, the supporting portion can hold the circumferential edge of the second gasket together with the top plate portion and compress the second gasket in the axial direction, and thus sealing properties between the cap and the sealing plate can be enhanced. In the case where the sealing plate is supported at a position higher than the cap, the supporting portion may be provided to extend to stand from an upper surface of the top plate portion. The supporting portion may be a complete annular shape extending in the circumferential direction, or may be formed intermittently in the circumferential direction as long as sealing is possible. Also, the supporting portion may be formed unitarily with the top plate portion, or the supporting portion formed separately may be combined with the top plate portion. In the case where the supporting portion is formed unitarily with the top plate portion, for example, on a supporting portion forming surface of the top plate portion, by forging the periphery of a portion where the supporting portion is to be formed, the portion may be made to have a large thickness.

The first engagement portion may be engaged by a second engagement portion provided in the opening edge portion. The second engagement portion includes, for example, a first surface that is an inner circumferential surface of the cylinder portion and a second surface that extends from the first surface and opposes the top plate portion. The second engagement portion may be formed in an outer circumferential surface of a housing portion of the cylinder portion, instead of the opening edge portion.

In the case where the first gasket covers at least a portion of the first surface, at least a portion of the first gasket that covers the first surface may be compressed in a direction (horizontal direction) perpendicular to the axial direction. As a result, the space between the side wall portion of the cap and the opening edge portion can be sealed. The first surface that constitutes the inner circumferential surface of the cylinder portion does not necessarily need to face in a direction strictly perpendicular to the axial direction, and may be inclined relative to the axial direction. If normal vectors of the first surface include a component in the horizontal direction, the first gasket that covers the first surface is compressed in the horizontal direction, and the space between the side wall portion and the opening edge portion can be sealed.

Likewise, in the case where the first gasket covers at least a portion of the second surface, at least a portion of the first gasket that covers the second surface may be compressed in the axial direction. As a result, the space between the side wall portion of the cap and the opening edge portion can be sealed. The second surface does not necessarily need to face in a direction strictly parallel to the axial direction, and may be inclined relative to the axial direction. If normal vectors of the second surface include a component in the axial direction, the first gasket that covers the second surface is compressed in the axial direction, and the space between the side wall portion and the opening edge portion can be sealed. The second surface may include an end face of the opening edge portion.

The first gasket may be provided between the cylinder portion and the side wall portion. In this case, the second engagement portion engages the first engagement portion via the first gasket provided between the cylinder portion and the side wall portion. The first gasket is in contact with the inner circumferential surface and the outer circumferential surface of the cylinder portion. Accordingly, sealing properties between the side wall portion and the opening edge portion can be enhanced. On the other hand, at a position lower than the portion where the first gasket is provided between the cylinder portion and the side wall portion, the cylinder portion and the side wall portion can be electrically connected. In the case where the space between the side wall portion and the cylinder portion is sealed by using the first gasket, a portion of the first gasket may not be provided between the top plate portion and the cylinder portion and between the supporting portion and the cylinder portion.

As an aspect of the second engagement portion, for example, a projecting portion that protrudes toward the outside of the cylinder portion in the horizontal direction (the radial direction) and/or is bent or curved toward the outside of the cylinder portion may be provided. The projecting portion may be implemented by increasing the thickness of the end portion of the opening edge portion so as to protrude outward, or by bending the opening edge portion outward. The first gasket may be provided between at least a portion of the projecting portion and the cap in a compressed state.

As with the second engagement portion, a projecting portion that protrudes toward the inside of the cylinder portion and/or is bent or curved toward the inside of the cylinder portion may be provided in the first engagement portion. The projecting portion may be implemented by increasing the thickness of the end portion of the side wall portion so as to protrude toward the inner circumferential side, or by bending the side wall portion inward. At this time, the projecting portion that constitutes the first engagement portion may be provided at a position lower than the projecting portion of the second engagement portion (on the electrode body side) such that the projecting portion that constitutes the first engagement portion and the projecting portion of the second engagement portion oppose each other. In this case, the projecting portion that constitutes the first engagement portion and the projecting portion of the second engagement portion form hooks, and thus the cap can be engaged with the opening edge portion against the repulsive force of the compressed first gasket. Accordingly, sealing properties between the side wall portion and the opening edge portion can be enhanced. Also, even if the internal pressure of the battery increases, sealing of the space between the side wall portion and the opening edge portion can be maintained.

It is preferable that the first engagement portion is configured such that at least a portion of the projecting portion that constitutes the first engagement portion that opposes the projecting portion of the second engagement portion abuts against the second engagement portion without the first gasket being provided therebetween. With this configuration, the first engagement portion and the second engagement portion are electrically connected to each other, and it is therefore possible to electrically connect the cap and the cylinder portion of the battery can via the abutting portion.

In the case where the space between the opening edge portion and the cap is sealed by using the repulsive force of the first gasket generated by compressing the first gasket, the repulsive force of the first gasket decreases as the thickness of the first gasket in the compression direction increases, and it is difficult to enhance sealing properties between the side wall portion and the opening edge portion. Accordingly, in order to increase the repulsive force of the first gasket and enhance sealing properties between the side wall portion and the opening edge portion, the cap may include an annular supporting wall that extends to stand from the surface of the top plate portion that opposes the bottom portion. An outer circumferential surface of the supporting wall abuts against an inner circumferential surface of the first gasket. The supporting wall may be formed in an annular shape that conforms to the shape of the contour of the opening edge portion, but may be formed to stand from the top plate portion intermittently along the circumferential direction. Also, the supporting wall may be used to ensure a gap between the first gasket and the second gasket.

In the case where the second engagement portion includes the projecting portion that is bent or curved and extends toward the outside of the cylinder portion and engages the first engagement portion by using the projecting portion (via the first gasket), the thickness of the first gasket in the compression direction (or the thickness of the space between the inner surface of the cap and the surface of the opening edge portion) varies on the inner side of the projecting portion, and thus the repulsive force of the first gasket is likely to be non-uniform. In order to obtain a high repulsive force of the gasket irrespective of the location of the bent portion, the outer circumferential surface of the supporting wall may be inclined along the bent portion of the second engagement portion. By doing so, a high repulsive force of the gasket can be obtained irrespective of the location of the bent portion, and sealing properties between the side wall portion and the opening edge portion can be enhanced. In other words, a region with a high sealing stress can be increased at the interface between the first gasket and the cylinder portion and the interface between the first gasket and the cap. Accordingly, it is possible to more reliably prevent outside air and moisture from passing through the region and entering the battery.

In a non-limiting second aspect, the sealing portion includes a sealing agent provided between the sealing member and the opening edge portion. The sealing agent is provided in a portion of a space between the side wall portion and the opening edge portion, and seals the space between the side wall portion and the opening edge portion.

As a result of the sealing member being configured to include a cap and a sealing plate, and the space between the side wall portion of the cap and the opening edge portion of the cylinder portion of the battery can being sealed by using a sealing agent, the airtightness of the battery can be ensured without forming an annular groove portion around the opening edge portion as in the conventional technology. Also, because the cap and the sealing plate are insulated from each other, it is unnecessary to provide an insulating gasket (also called "outer gasket") between the cap and the opening edge portion. As described above, because the groove portion (and the outer gasket) are not provided, the volume of the portion above the electrode body (more specifically, the proportion of the sealing mechanism such as the sealing member in the up-down direction (or the height direction) of the battery) can be reduced as compared with conventional batteries. Accordingly, the height of the portion above the electrode body can be reduced. Also, the volume of the electrode body can be increased, and it is therefore possible to increase capacity density.

The side wall portion of the cap may be bent inward in the radial direction of the cylinder portion together with the opening edge portion. By bending the side wall portion together with the opening edge portion, airtightness can be further enhanced. Accordingly, a battery with a high pressure resistance can be ensured. Also, the reliability of electrical connection between the side wall portion and the opening edge portion can be enhanced.

The top plate portion of the cap may include a concave portion that houses the circumferential edge of the sealing plate. An insulating gasket may be provided between the concave portion and the sealing plate. By doing so, the sealing plate can be stably held by the cap while the sealing plate and the cap are insulated from each other. As a result of the sealing plate being held by the cap, the volume of the sealing member can be further reduced. For example, a third gasket that has insulating properties may be provided between the concave portion and the sealing plate.

The top plate portion of the cap may include a supporting portion that extends to stand vertically on the inner side than the side wall portion in the radial direction of the cylinder portion and is bent inward. The concave portion of the top plate portion may be formed by bending the supporting portion. In this case, the sealing plate can be stably held by the concave portion formed by bending the supporting portion.

The cylinder portion may include a step portion formed at a bottom portion-side end portion of the opening edge portion on an inner side of the cylinder portion. The step portion is formed by reducing the thickness of the opening edge portion of the cylinder portion to be smaller than the thickness of the remaining portion (the thickness of a portion excluding the opening edge portion of the cylinder portion). The cap is placed on the step portion. It is preferable that the sealing agent is further provided between the step portion and the cap. When the sealing member is inserted from the opening of the cylinder portion, the step portion restricts the sealing member from being inserted further downward, which makes it easy to position the sealing member. Also, with the step portion, the sealing member is stably held by the opening edge portion of the cylinder portion. Because the sealing agent is provided between the step portion and the cap, even when the step portion is formed, airtightness can be ensured.

In a non-limiting third embodiment, the sealing member includes a fourth gasket that seals a space between the inner circumferential surface of the cylinder portion and the sealing plate. A sealing portion is provided in a portion of the side wall portion, and the sealing portion presses the cylinder portion and the fourth gasket in a direction from an outer circumferential surface toward an inner circumferential surface of the side wall portion. Accordingly, the sealing portion electrically connects the side wall portion and the battery can, and the fourth gasket is interposed between the sealing plate and the inner circumferential surface of the cylinder portion in a compressed state.

The fourth gasket seals a space between the opening edge portion of the battery can and the sealing plate. The space between the opening edge portion and the sealing plate can be sealed by, for example, overlapping the inner circumferential surface of the cylinder portion of the battery can and a side face of the gasket each other, and pressing the opening edge portion and the gasket toward the inner circumferential surface side (in a direction toward the axis of the cylinder portion) in the horizontal direction by the side wall portion, with the outer circumferential surface of the cylinder portion overlapping the side wall portion of the cap. By being pressed, the gasket is compressed in the radial direction of the opening between the side wall portion of the cap and the sealing plate, and due to the repulsive force of the gasket, sealing properties between the sealing member and the inner circumferential surface of the cylinder portion are ensured, and the sealing member is fixed to the battery can. A portion of the gasket may be present in a compressed state in at least the vicinity of the pressing portion of the side wall portion (or in other words, sealing portion) between the sealing plate and the inner circumferential surface of the cylinder portion.

A groove portion with a small inner diameter (hereinafter, also referred to as "radially recessed portion") may or may not be formed in the cylinder portion in proximity to the opening edge portion. In the present embodiment, the space between the inner circumferential surface of the cylinder portion and the sealing plate is sealed by compressing the gasket with the side wall portion of the cap, and it is therefore unnecessary to form a radially recessed portion in the vicinity of the opening edge portion of the cylinder portion. Accordingly, in the case where the radially recessed portion is not formed, the size of the electrode body is not limited by the radially recessed portion, and thus a high capacity battery can be easily achieved. On the other hand, by forming the radially recessed portion, the gasket can be easily positioned to the cylinder portion. In the case where the radially recessed portion is not formed, it is preferable to position the gasket to the cylinder portion by providing the gasket with an engagement portion that protrudes toward the outer circumferential side and is engaged with the opening edge portion.

The outer circumferential surface of the cylinder portion on the opening edge portion side is overlapped with the inner circumferential surface of the side wall portion of the cap. At this time, a projection that protrudes inward may be provided on the inner circumferential surface side of the side wall portion. The cylinder portion is pressed by the projection, and the gasket is compressed in a direction from the outer circumferential surface toward the inner circumferential surface of the side wall portion via the pressed portion of the cylinder portion. The projection can be formed by recessing the cylinder portion inward. As the projection, a plurality of projections may be formed intermittently along the circumferential direction of the opening, or a projection that is continuous along the circumferential direction of the opening may be formed.

The cap is configured such that, for example, an inner surface of the top plate portion that opposes the electrode body abuts against the fourth gasket and seals the space between the sealing plate and the top plate portion. However, the opening edge portion does not necessarily need to be in contact with the inner surface of the top plate portion. It is preferable that an end face (opening edge) of the cylinder portion opposes the inner surface of the top plate portion with the fourth gasket and/or a gap interposed therebetween. With this configuration, the top plate portion can be easily leveled, and an external lead wire can be easily connected to the top plate portion. In the case where the above-described engagement portion is provided, the end face (opening edge) of the cylinder portion is covered with the fourth gasket. In this case, a gap may or may not be provided between the fourth gasket that covers the opening edge and the top plate portion.

The cylinder portion may include a supporting portion that protrudes toward the inner circumferential surface side of the cylinder portion to support the fourth gasket on the electrode body side. The supporting portion is provided to position the fourth gasket to the cylinder portion. The supporting portion may be formed by increasing the thickness of a portion of the cylinder portion or by recessing the cylinder portion in the radial direction. The supporting portion may or may not be used to seal the sealing plate. Although depending on the protrusion length of the supporting portion, by providing the fourth gasket between the supporting portion and the top plate portion of the cap, the fourth gasket is compressed in the axial direction, and thus sealing properties can be enhanced. However, in the case where the supporting portion is not used to seal the sealing plate, the protrusion length of the supporting portion may be shorter than the length of a conventional groove portion (radially recessed portion). It is sufficient that the protrusion length of the supporting portion is a length with which the fourth gasket can be positioned, and the protrusion length of the supporting portion may be for, example, 0.005 times or more of the maximum inner diameter of the opening edge.

In a non-limiting fourth embodiment, the sealing portion includes a fifth gasket that seals a space between the opening edge portion and the cap. The fifth gasket is provided between the opening edge portion and the top plate portion, and the opening edge portion is pressed in the axial direction by the fifth gasket. That is, the fifth gasket provided between the top plate portion and the opening edge portion is compressed in at least the axial direction, as a result of which, the space between the opening edge portion of the battery can and the sealing plate is sealed. In this case, it is unnecessary to form a conventional annular groove (also referred to as "radially recessed portion"), and it is therefore possible to dispose the electrode body in more proximity to the sealing plate, or increase the height of the electrode body to a position in proximity to the sealing body. Accordingly, the energy density of the battery can be increased.

The space between the cap and the opening edge portion and the space between the cap and the sealing plate are sealed by using, for example, a gasket. The space between the cap and the opening edge portion and the space between the cap and the sealing plate may be sealed by using the same gasket (fifth gasket), or the space between the cap and the opening edge portion may be sealed by using the fifth gasket, and the space between the cap and the sealing plate may be sealed by using another gasket (sixth gasket). In the case where the sixth gasket is used, the sixth gasket may be provided spaced apart from the fifth gasket. In the case where the space between the cap and the opening edge portion and the space between the cap and the sealing plate are sealed by using the fifth gasket alone, the space between the cap and the sealing plate can be sealed by, for example, also providing the fifth gasket in a space between the outer circumferential edge portion of the sealing plate and the top plate portion.

The cap may include a supporting portion that extends toward the bottom portion in the axial direction on an inner circumferential side than a position of the side wall portion of the top plate portion. The supporting portion is provided to, for example, fix the sixth gasket in a compressed state and seal the space between the cap and the sealing plate. In this case, the sixth gasket may be provided between the inner circumferential surface of the supporting portion and at least the outer circumferential edge portion of the sealing plate. On the other hand, the fifth gasket may be provided in an outer circumferential region that is located on the outer circumferential side than the supporting portion and includes the outer circumferential end portion of the top plate portion.

In order to enhance sealing properties between the cap and the sealing plate, the supporting portion may extend toward the bottom portion in the axial direction, then be bent along the circumferential edge of the sixth gasket, and extend inward.

In these aspects, the cylinder portion and the side wall portion each may have the shape of a circular cylinder or a prism. In the case where the cylinder portion has the shape of a circular cylinder, the side wall portion of the cap is configured to have the shape of a circular cylinder, and the inner circumferential surface of the side wall portion is overlapped with the outer circumferential surface of the cylinder portion on the opening edge portion side. At this time, in at least a portion of a region (overlapping region) of the cylinder portion overlapping the inner circumferential surface of the side wall portion, the cap and the cylinder portion can be electrically connected.

The overlapping region may be recessed in the radial direction. In other words, the outer diameter of the cylinder portion in the overlapping region may be smaller than the outer diameter of the cylinder portion excluding the overlapping region. The inner diameter of the side wall portion of the cap may be less than or equal to the maximum value of the outer diameter of the cylinder portion. By doing so, the outer diameter of the side wall portion of the cap is substantially equal to or less than the outer diameter of the cylinder portion on the bottom portion side, and it is thereby possible to reduce variations in the battery diameter in the axial direction.

Here, the inner diameter (outer diameter) of the cylinder portion and/or the side wall portion refers to, in the case where the cylinder portion and/or the side wall portion are/is not cylindrical, the diameter of the smallest circle circumscribing the shape of the contour of the inner circumference (outer circumference) of the cylinder portion and/or the side wall portion.

As used herein, the expression "the inner circumferential surface of the side wall portion is overlapped with the outer circumferential surface of the cylinder portion on the opening edge portion side" is not limited to the case where the inner circumferential surface of the side wall portion is in direct contact with the outer circumferential surface of the cylinder portion on the opening edge portion side. In a portion of the overlapping region, the inner circumferential surface of the side wall portion may oppose the outer circumferential surface of the cylinder portion on the opening edge portion side via a gap, a gasket, or the like.

The inner circumferential surface of the side wall portion of the cap may be bonded to the outer circumferential surface of the cylinder portion. It is sufficient that they are bonded in at least a portion of the above-described overlapping region. They may be bonded by, for example, welding. By performing welding, the cap is firmly fixed to the battery can, and resistance decreases, as a result of which, current collection is improved. The welding method is not particularly limited, and may be selected as appropriate according to the material of the cap and the battery can. Examples of the welding method include laser welding, resistance welding, friction stir welding, braze welding, and the like.

The method for sealing a space between the cap and the sealing plate by using the sealing member is not particularly limited. For example, the sealing plate may be connected to the top plate portion of the cap while being insulated from the cap. The sealing plate may be connected to the lower surface (which is the surface that opposes the bottom portion) of the top plate portion via a gasket, or may be connected to the upper surface (which is the surface that does not oppose the bottom portion) of the top plate portion via a gasket. Also, the sealing plate may be disposed within a through hole formed in the ring-shaped top plate portion. However, from the viewpoint of height reduction, it is preferable that the lower surface of the sealing plate that opposes the bottom portion is not located at a position higher than the upper surface of the top plate portion.

The sealing plate and the gasket (the second, third, fourth, fifth, or sixth gasket) used to seal the space between the cap and the sealing plate may be joined to each other. For example, by integrally molding the sealing plate and the gasket, a sealing body in which the sealing plate and the gasket are joined to each other can be obtained. As the method for integrally molding the sealing plate and the gasket, insert molding can be used. In this case, the shapes of the sealing plate and the gasket are not particularly limited, and the sealing plate and the gasket can be designed to have any shape. Also, as a result of the sealing plate and the gasket being integrally molded, the sealing plate and the gasket can be handled as one component, and thus the production of the battery can be facilitated.

By attaching and fixing the sealing body as described above to the cap, a sealing member in which the space between the cap and the sealing plate is sealed can be obtained. The sealing member in this state can also be handled as one component. After that, the sealing member is attached to the battery can, and the space between the cylinder portion and the cap is sealed. By doing so, it is possible to easily produce a battery with a high energy density in which electric current can be collected on the upper part of the battery.

The gaskets (the second to sixth gaskets) for sealing the space between the cap and the sealing plate each include: for example, an inner ring portion disposed on the circumferential edge portion of the sealing plate on an electrode body side (inner side); an outer ring portion disposed on the circumferential edge portion of the sealing plate on a side (outer side) opposite to the electrode body side; and a relay ring portion that covers an end face of the circumferential edge portion of the sealing plate. The shapes of the inner ring portion, the outer ring portion, and the relay ring portion are not particularly limited, and the inner ring portion, the outer ring portion, and the relay ring portion can be designed to have any shape. For example, the shape of the inner circumferential contour of the outer ring portion is not limited to a circular shape, and the outer ring portion may be designed to have a shape that has rotational symmetry and/or plane symmetry such as an equilateral polygon or a wavy curve, or may also be designed to have a shape that has the function of fitting with a component such as an external lead wire. It is also easy to form irregularities or an opening through which the sealing plate is exposed, at a specific position of the outer ring portion or the inner ring portion, or increase thickness at a predetermined position of the outer ring portion.

Hereinafter, batteries according to the aspects of the present disclosure will be described specifically with reference to the drawings. However, the present invention is not limited thereto.

[First Aspect]

A battery according to a first aspect of the present disclosure includes: a battery can that includes a cylinder portion that includes an opening edge portion at one of end portions of the cylinder portion and a bottom portion that closes the other one of the end portions of the cylinder portion; an electrode body that is housed in the cylinder portion; and a sealing member that is fixed to the cylinder portion to seal an opening of the opening edge portion. The sealing member includes: a sealing plate; a cap that has a through hole corresponding to the sealing plate and is connected to the sealing plate while being electrically insulated from the sealing plate; and a first gasket that seals a space between the cylinder portion and the cap. With a direction in which the two end portions of the cylinder portion face each other being defined as an axial direction, the cap includes: a ring-shaped top plate portion that is disposed to oppose the opening edge portion in the axial direction and lie along a circumferential edge of the sealing plate; and a side wall portion that extends from a circumferential edge of the top plate portion toward the bottom portion and covers an outer circumferential surface of the cylinder portion. The side wall portion may include a first engagement portion that is engaged with the cylinder portion. The first gasket is provided between the cap and the cylinder portion in a compressed state. The battery can is electrically connected to one of electrodes included in the electrode body, the sealing plate is electrically connected to the other one of the electrodes included in the electrode body, and the cap is electrically connected to the cylinder portion.

First Embodiment

Figure 2:
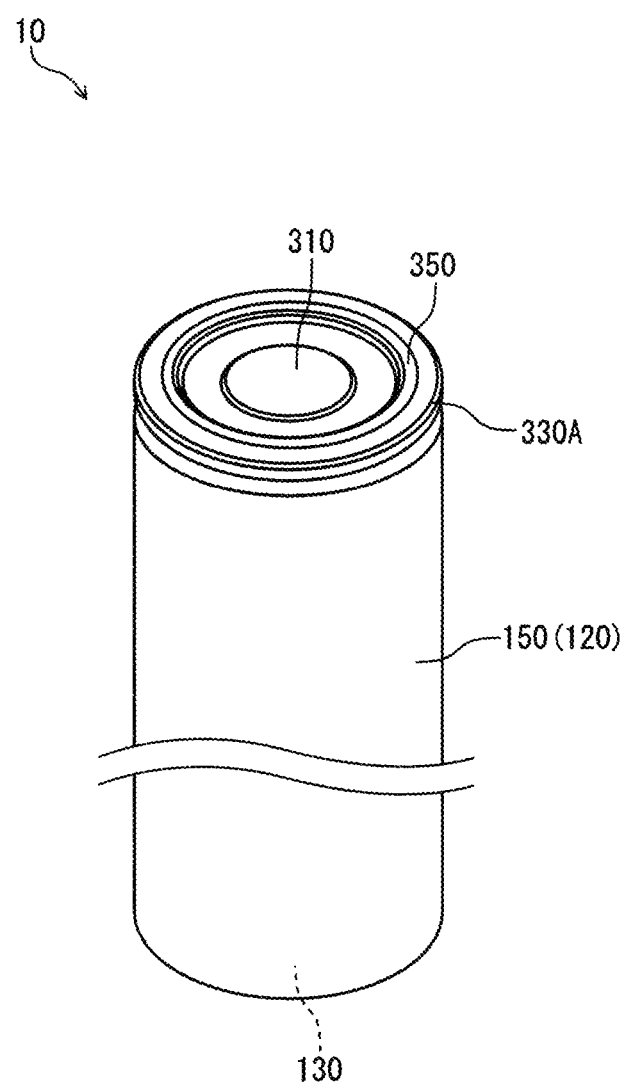
FIG. 2 is a perspective view showing an outer appearance of a battery can of the battery.
Figure 3:
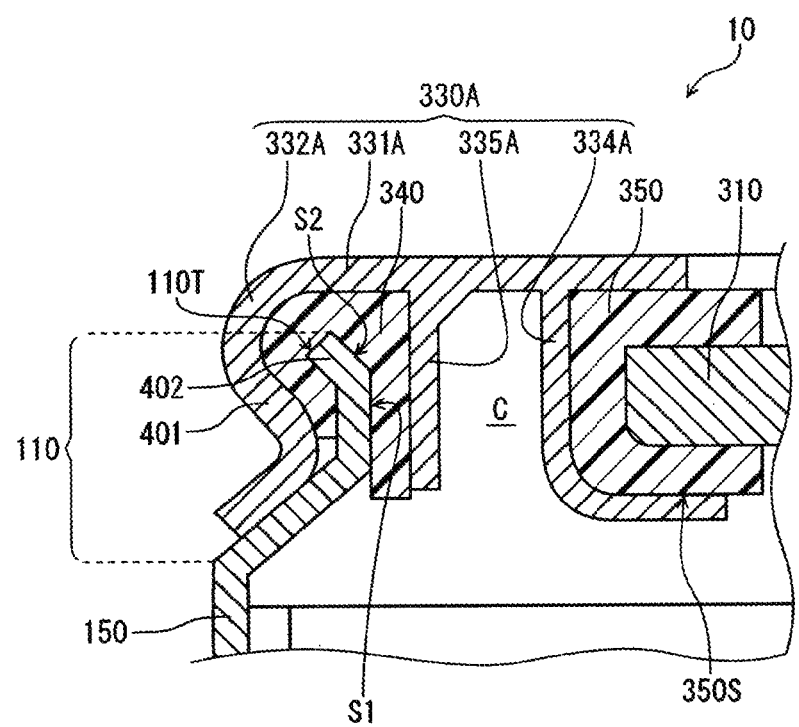
FIG. 3 is an enlarged schematic vertical cross sectional view of a relevant part of the battery shown in FIG. 1.

FIG. 1 is a schematic vertical cross sectional view showing an embodiment of the battery according to the first aspect of the present disclosure, and FIG. 2 is a perspective view of the battery. FIG. 3 is an enlarged schematic vertical cross sectional view of the vicinity of an opening edge portion 110 in a battery 10 shown in FIG. 1. FIGS. 1 to 3 are drawn to emphasize the cylinder portion of the battery, in particular, the vicinity of the opening edge portion 110. Also, an illustration of an upper insulating plate that is placed on an electrode body 200 is omitted. The dimensional ratio between elements of constituent members such as a sealing plate 310, a cap 330A, and gaskets 340 and 350 does not necessarily match the actual dimensional ratio. The same applies to the other drawings.

The battery 10 is a cylindrical battery, and includes a bottomed cylindrical battery can 100, a cylindrical electrode body 200 that is housed in the can, and a sealing member 300A that seals an opening of the battery can 100.

The battery can 100 includes a cylinder portion 120 that houses the electrode body 200 and a bottom portion 130. The cylinder portion 120 includes an opening edge portion 110 at one end portion of the cylinder portion 120, and the other end portion is closed by the bottom portion 130. The cylinder portion 120 includes the opening edge portion 110 and a housing portion 150 that houses the electrode body. An opening of the opening edge portion 110 is closed by the sealing member 300A.

The sealing member 300A includes a sealing plate 310, a cap 330A, a first gasket 340, and a second gasket 350.

The sealing plate 310 may be disc-shaped and have an explosion prevention function. Specifically, the sealing plate 310 includes a circumferential edge portion 311 and a center region 312 that have a large thickness to ensure mechanical strength, and a thin portion 313 that exhibits the explosion prevention function. The thin portion 313 is provided in a region between the circumferential edge portion 311 and the center region 312. An end portion of a lead wire 210 drawn out from the positive electrode or the negative electrode that constitutes the electrode body 200 is connected to an inner surface of the center region 312. Accordingly, the sealing plate 310 functions as one of the terminals.

When the inner pressure of the battery can 100 increases, the sealing plate 310 bulges outward, and, for example, a stress caused by the tension concentrates on a boundary between the circumferential edge portion 311 and the thin portion 313, and a fracture occurs from the boundary. As a result, the inner pressure of the battery can 100 is released, and safety of the battery 10 is ensured.

The cap 330A includes a ring-shaped top plate portion 331A disposed along a circumferential edge of the sealing plate 310 and a cylindrical side wall portion 332A. The cap 330A is electrically insulated from the sealing plate 310 by the second gasket 350. The side wall portion 332A extends from an outer circumferential edge of the top plate portion 331A toward the bottom portion 130 while being bent, and covers an outer circumferential surface of the opening edge portion 110 directly or indirectly via the first gasket 340. In the side wall portion 332A, a portion that extends toward the inner side while being bent constitutes a first engagement portion 401. The side wall portion 332A that is bent as described above may be produced through processing of crimping the side wall portion 332A inward in a direction (horizontal direction) perpendicular to the axial direction of the cylinder portion. The first engagement portion 401 may be formed in advance before sealing is performed.

The cap 330A is electrically conductive, and has the same polarity as that of the battery can 100. Accordingly, the cap 330A can function as the other terminal that has a polarity different from that of the sealing plate 310. For this reason, electric current generated in both electrodes of the battery 10 can be collected from an upper surface of the sealing member 300A. For example, a configuration is possible in which a first external lead wire 501 is connected to the top plate portion 331A of the cap 330A, and a second external lead wire 502 is connected to an outer surface of the center region 312 of the sealing plate 310.

The cap 330A further includes a supporting portion 334A and a supporting wall 335A.

In the top plate portion 331A, the supporting portion 334A extends to stand vertically from a position on an inner circumferential side than the side wall portion 332A and extends toward the bottom portion 130 in the axial direction. The second gasket 350 is fixed to the cap 330A by the supporting portion 334A, with a space between the cap 330A and the sealing plate 310 being sealed. The contour line of the supporting portion 334A when the position where the supporting portion 334A extends vertically from the top plate portion 331A is viewed from the axial direction may have a shape that conforms to an outer edge of the second gasket 350. For example, in the case where the battery is a cylindrical battery, and the outer edge of the second gasket when viewed from the axial direction is circular, the contour line of the supporting portion 334A is also circular. However, the contour line does not necessarily need to be a closed curve, and may include a partial region where the supporting portion 334A is not provided in the circumferential direction.

In the present embodiment, the supporting portion 334A extends toward the bottom portion 130 in the axial direction, and is bent along the circumferential edge of the second gasket to extend inward toward the center region 312 of the sealing plate 310. With this configuration, sealing properties between the cap 330 and sealing plate 310 can be further enhanced. The bent portion of the supporting portion 334A may be formed by crimping and bending a portion of the vertically extending supporting portion 334A toward the inner circumferential side. The bent portion does not necessarily need to be formed around the entire circumference of the supporting portion 334A, and may be formed intermittently along the circumferential direction.

The supporting wall 335A is provided to form a gap C between the first gasket 340 and the second gasket 350 and adjust the thickness of the first gasket 340 between the supporting wall 335A and a first surface S1 that constitutes the inner circumferential surface of the cylinder portion, which will be described later.

As described above, in the case where the first engagement portion 401 is formed by crimping the side wall portion 332A inward in the horizontal direction, the sealing plate may deform as a result of a force in the horizontal direction being transmitted to the sealing plate. However, by providing the gap C, it is possible to prevent the force in the horizontal direction from being transmitted directly to the sealing plate. Accordingly, deformation of the sealing plate can be suppressed.

Also, a portion of the first gasket 340 that is in contact with the first surface S1 is compressed in the horizontal direction as a result of the side wall portion 332A being crimped in the horizontal direction to seal the space between the side wall portion 332A and the opening edge portion 110. However, the thicker the first gasket in the compression direction, the more dispersed the force applied during compression, and thus the repulsive force of the gasket is likely to decrease. The supporting wall 335A functions to adjust the thickness of the first gasket in the compression direction to a thickness with which a high repulsive force can be obtained, and enhance sealing properties between the side wall portion 332A and the opening edge portion 110. The supporting wall 335A may be formed in an annular shape along the shape of the contour of the opening edge portion 110, but may be formed intermittently along the circumferential direction.

One end portion of the opening edge portion 110 is continuous with the housing portion 150. An end portion 110T that is the other end portion of the opening edge portion 110 is covered with the first gasket 340.

The first gasket 340 seals the space between the cap 330A and the opening edge portion 110. The first gasket 340 covers at least the inner circumferential surface of the opening edge portion 110, and is provided between the cylinder portion 120 (the opening edge portion 110) and the top plate portion 331A in a compressed state. The outer diameter of the first gasket 340 may be larger than the inner diameter of the side wall portion 332 in a no-load state. In this case, by press-fitting the first gasket 340, the first gasket 340 can be brought into close contact with the cap 330A.

The second gasket 350 seals a space between the cap 330A and the sealing plate 310. The second gasket 350 includes an outer ring portion that covers an upper surface of the circumferential edge portion 311 of the sealing plate 310, an inner ring portion that covers a lower surface of the circumferential edge portion 311 of the sealing plate 310, and a relay ring portion that connects the outer ring portion and the inner ring portion. The outer ring portion, the inner ring portion, and the relay ring portion of the second gasket 350 are formed as an integrally molded body. The second gasket 350 may be integrally molded with the sealing plate 310 by means of, for example, insert molding. By performing integral molding, a state in which the sealing plate 310 and the gasket 350 closely adhere to each other can be easily achieved. Also, as a result of the sealing plate 310 and the gasket 350 being integrally molded, the sealing plate 310 and the gasket 350 can be handled as one component, and thus the production of the battery 10 can be facilitated.

The outer diameter of the second gasket 350 may be larger than the inner diameter of the supporting portion 334A in a no-load state. In this case, by press-fitting the second gasket 350, the relay ring portion of the second gasket 350 comes into close contact with the supporting portion 334A, and thus a space between the cap 330 and the sealing plate 310 can be sealed.

The opening edge portion 110 is recessed in the radial direction relative to the housing portion 150, and the end portion 110T of the opening edge portion is bent toward the outside of the cylinder portion 120. With this bent portion, a second engagement portion 402 is formed.

The second engagement portion 402 includes a first surface S1 that constitutes an inner surface of the cylinder portion 120 and a second surface S2 that also constitutes the inner surface of the cylinder portion 120 and is bent from the first surface S1 to oppose the top plate portion 331A. The first surface S1 and the second surface S2 are covered with the first gasket 340.

A portion of the first gasket 340 that is between the first surface S1 and the supporting wall 335A is compressed in the horizontal direction. Also, a portion of the first gasket 340 that is between the second surface S2 and the top plate portion 331A may be compressed in the axial direction and the horizontal direction. Due to the repulsive force generated by the first gasket 340 being compressed, the space between the cap 330A and the opening edge portion 110 is sealed. The first gasket 340 is also provided between the cylinder portion 120 (the opening edge portion 110) and the side wall portion 332A. The second engagement portion 402 engages the first engagement portion 401 via the first gasket 340 provided between the opening edge portion 110 and the side wall portion 332A on the other side of the first surface S1.

At a position lower than the first gasket 340 provided between the opening edge portion 110 and the side wall portion 332A, the side wall portion 332A extends along the cylinder portion 120 while being in contact with the cylinder portion 120 (the opening edge portion 110), and the side wall portion 332A is electrically connected to the cylinder portion 120. In a portion of the contact region between the side wall portion 332A and the cylinder portion 120, an inner circumferential surface of the side wall portion 332A may be bonded to the outer circumferential surface of the cylinder portion 120 by welding. By doing so, the sealing member 300A can be fixed to the cylinder portion 120, and the reliability of electrical connection between the cap 330A and the cylinder portion 120 can be enhanced.

The inner circumferential surface of the side wall portion 332A of the cap 330A overlaps the outer circumferential surface of the cylinder portion 120 on the opening edge portion 110 side. The inner diameter of the side wall portion 332A is less than or equal to the maximum value of the outer diameter of a portion (the housing portion 150) of the cylinder portion 120 that does not overlap the inner circumferential surface of the side wall portion 332A. That is, the portion (the opening edge portion 110) of the cylinder portion 120 that overlaps the inner circumferential surface of the side wall portion 332A is recessed in the radial direction. By doing so, the outer diameter of the side wall portion 332A of the cap 330A is substantially equal to or less than the outer diameter of the housing portion 150, thereby reducing variations in the axial direction in the battery diameter. In the present embodiment, the opening edge portion 110 is recessed in the radial direction, but the opening edge portion 110 is recessed in the radial direction from a height similar to the height of an opposing surface 350S of the second gasket 350 that opposes the electrode body. For this reason, the reduction in the placement space for the electrode body caused due to the opening edge portion 110 being recessed in the radial direction is suppressed, as compared with the conventional configuration in which the radially recessed portion is formed by forming a groove. Accordingly, a battery with a high energy density can be achieved. Furthermore, a region at a position higher than the opposing surface 350S may be set as the region of the opening edge portion 110 that is recessed in the radial direction. In this case, despite the fact that the opening edge portion 110 is recessed in the radial direction, the placement space for the electrode body is not restricted.

A surface of the first gasket 340 that is in contact with the opening edge portion 110 may include a protruding portion (or in other words, a protruding surface) that protrudes in the radial direction of the cylinder portion 120 in a no-load state. By simply fitting the cap 330A into the opening edge portion 110 of the cylinder portion 120 of the battery can 100, the protruding portion is compressed to a certain degree and produces a certain level of airtightness. Furthermore, by crimping the side wall portion 332A of the cap 330A in the horizontal direction, the compression ratio of the protruding portion is increased significantly, and thereby the airtightness of the battery is further improved.

Figure 4:
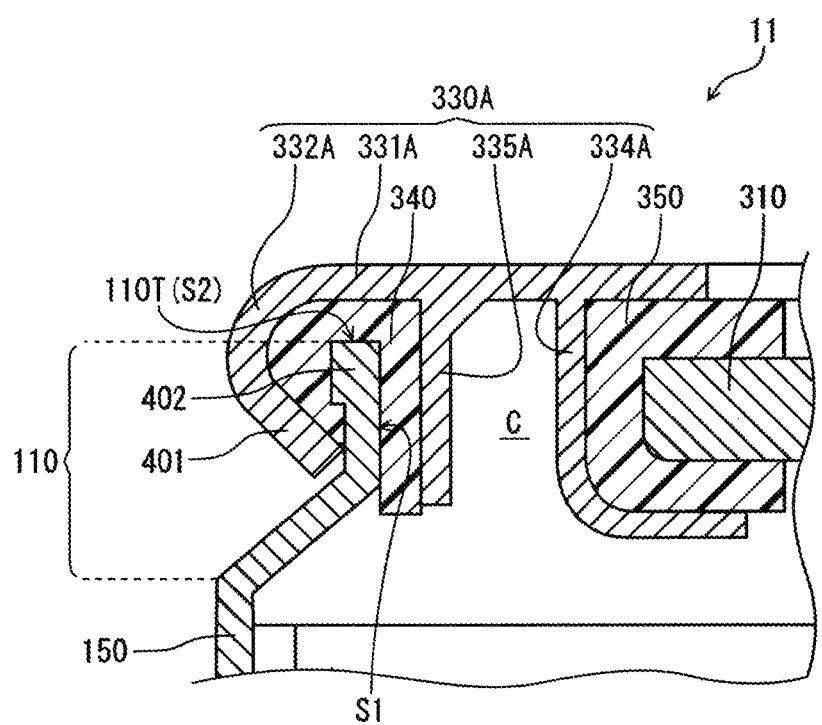
FIG. 4 is an enlarged schematic vertical cross sectional view of a relevant part, showing a variation of the battery shown in FIG. 1.

FIG. 4 shows a variation of the battery 10. FIG. 4 is an enlarged schematic vertical cross sectional view of the vicinity of an opening edge portion 110 in a battery 11 according to an embodiment. In the battery 11, a side wall portion 332A is bent inward from an outer circumferential edge of a top plate portion 331A toward a bottom portion 130 and is in point (or line) contact with a cylinder portion 120, instead of extending along an outer circumferential surface of the cylinder portion 120 (the opening edge portion 110). In this case, at the position at which the side wall portion 332A is in point contact or line contact with the cylinder portion 120, an inner circumferential surface of the side wall portion 332A and the outer circumferential surface of the cylinder portion 120 may be welded to each other.

Also, in the battery 11, instead of the end portion 110T of the opening edge portion being bent toward the outside of the cylinder portion 120, a flange-shaped projecting portion is formed by increasing the thickness of the cylinder portion at the end portion 110T. With this projecting portion, a second engagement portion 402 is formed. An upper end face of the opening edge portion 110 constitutes the second surface S2. The second surface S2 also serves as a side face of the projecting portion, and is substantially parallel to a surface of the top plate portion 331A that opposes the bottom portion. The second surface S2 opposes the surface of the top plate portion 331A that opposes the bottom portion. A portion of the first gasket 340 provided between the first surface S1 and the supporting wall 335A is compressed in the horizontal direction. A portion of the first gasket 340 provided between the second surface S2 and the top plate portion 331A may be compressed in the axial direction.

Figure 5:
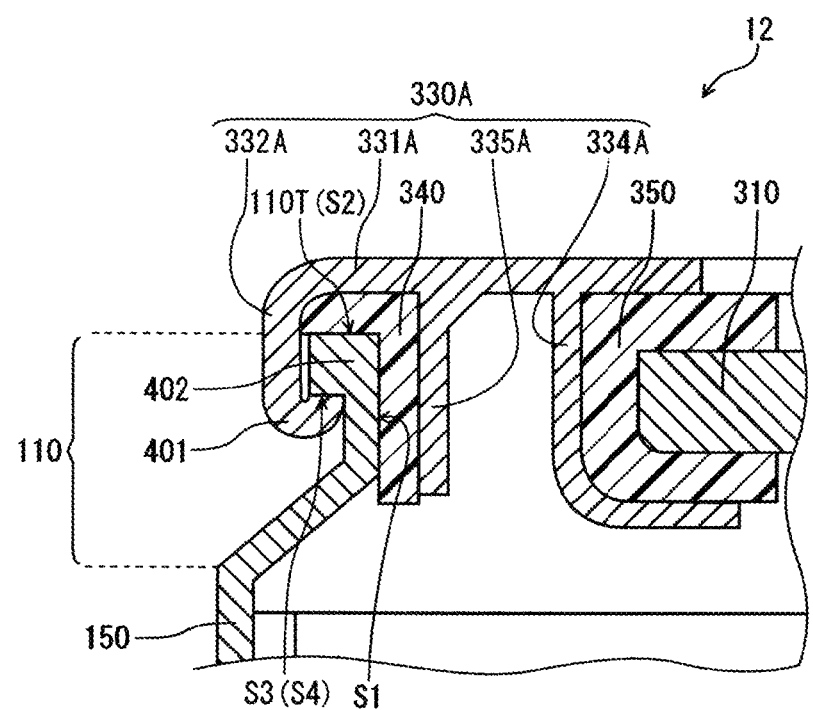
FIG. 5 is an enlarged schematic vertical cross sectional view of a relevant part, showing a variation of the battery shown in FIG. 1.

FIG. 5 shows another variation of the battery 10. FIG. 5 is an enlarged schematic vertical cross sectional view of the vicinity of an opening edge portion 110 in a battery 12 according to an embodiment. As with the battery 11, a flange-shaped projecting portion is formed at an end portion 110T in the battery 12, and with this projecting portion, a second engagement portion 402 is formed. As with the battery 11, an end face of the opening edge portion 110 constitutes a second surface S2. The second surface S2 also serves as a side face of the projecting portion, and is substantially parallel to the surface of the top plate portion 331A that opposes the bottom portion. The second surface S2 opposes the surface of the top plate portion 331A that opposes the bottom portion.

In the battery 12, the first gasket 340 covers the first surface S1 that constitutes the inner circumferential surface of the cylinder portion 120 (the opening edge portion 110) and the second surface S2 that is an end face of the opening edge portion 110, and is provided between the first surface S1 and the supporting wall 335A and between the second surface S2 and the top plate portion 331A. A portion of the first gasket 340 provided between the first surface S1 and the supporting wall 335A is compressed in the horizontal direction. A portion of the first gasket 340 provided between the second surface S2 and the top plate portion 331A may be compressed in the axial direction. On the other hand, the first gasket 340 is not provided between the outer circumferential surface of the opening edge portion 110 and the side wall portion 332A.

In the battery 12, an end portion of the side wall portion 332A includes a projecting portion that is bent inward. With this projecting portion, a first engagement portion 401 is formed. The projecting portion of the side wall portion 332A that constitutes the first engagement portion 401 is located below (on the bottom portion side) the projecting portion of the opening edge portion 110 that constitutes the second engagement portion 402, and opposes the projecting portion of the opening edge portion 110 that constitutes the second engagement portion 402.

More specifically, the side wall portion 332A is bent inward at the projecting portion that constitutes the first engagement portion 401, and thus the inner circumferential surface or the end face of the first engagement portion 401 faces upward (toward the top plate portion 331A). A surface of the projecting portion that constitutes the second engagement portion 402, the surface being on the opposite side of the second surface S2, faces downward. As a result of the surface (third surface S3) of the side wall portion 332A that faces upward and the surface (fourth surface S4) of the opening edge portion 110 that faces downward opposing each other, the projecting portions of the first engagement portion 401 and the second engagement portion 402 constitute hooks, and the cap 330A is engaged with the cylinder portion 120.

The battery 12 may be produced through processing of crimping the side wall portion 332A inward in the horizontal direction of the cylinder portion, with the cap 330A being pressed against the cylinder portion 120 via the first gasket 340. Accordingly, with the first gasket 340 being compressed in the axial direction, at least a portion of the third surface is in contact with the fourth surface, and the side wall portion 332A and the cylinder portion 120 are electrically connected to each other. Due to the repulsive force of the first gasket 340, the first engagement portion 401 and the second engagement portion 402 come into close contact with each other, and the electrical connection between the side wall portion 332A and the cylinder portion 120 is maintained.

Figure 6A:
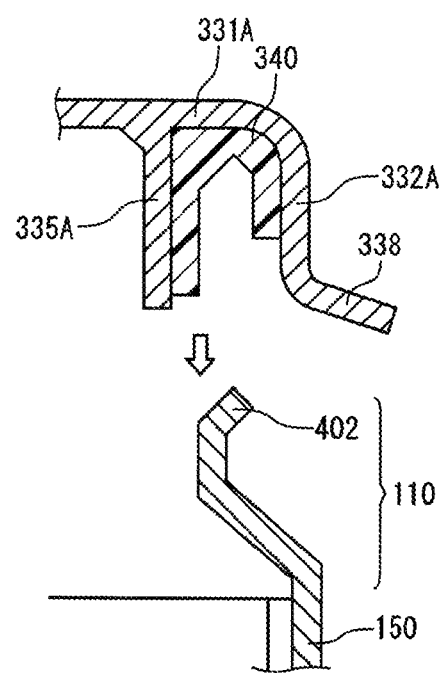
FIG. 6A is a schematic vertical cross sectional view showing a step of sealing the battery shown in FIG. 1.
Figure 6B:
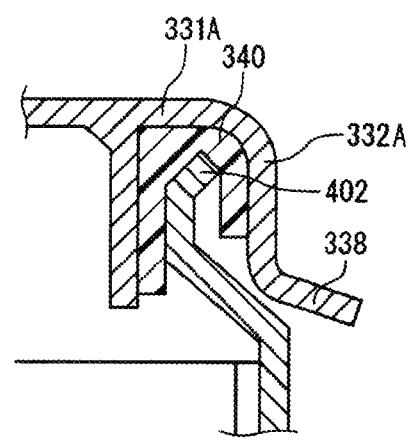
FIG. 6B is a schematic vertical cross sectional view showing the step of sealing the battery shown in FIG. 1.
Figure 6C:
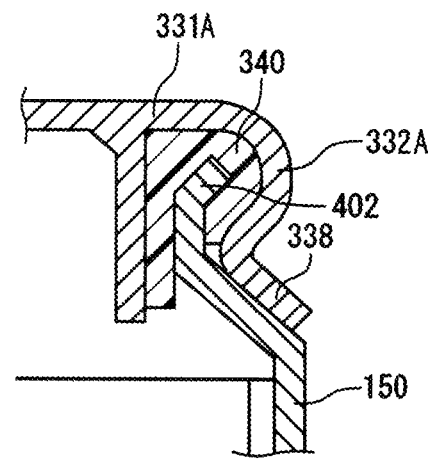
FIG. 6C is a schematic vertical cross sectional view showing the step of sealing the battery shown in FIG. 1

FIGS. 6A to 6C are cross-sectional views showing an example of the step of sealing the opening edge portion 110 of the battery 10, each being an enlarged schematic view of the vicinity of the opening edge portion 110. In the batteries 11 and 12 as well, the opening edge portion 110 can be sealed by performing the same step.

First, an intermediate sealing member is prepared that includes a sealing plate 310 and a second gasket 350 and in which a space between a cap 330A and the sealing plate 310 is sealed. In the intermediate sealing member, a first gasket 340 is inserted into a space between a side wall portion 332A and a supporting wall 335A of the cap 330A, and thereby a sealing member 300A is obtained. However, as shown in FIG. 6A, in the sealing member in this state, an end portion 338 of the side wall portion 332A of the cap 330A extends outward.

Also, a second engagement portion 402 is formed by recessing an opening edge portion 110 in the radial direction, and bending an end portion of the opening edge portion 110, which has been recessed in the radial direction, outward.

Next, as shown in FIG. 6B, the sealing member 300A is placed over the opening edge portion 110 such that the second engagement portion 402 is fitted into a concave portion of the first gasket 34.

Next, with the sealing member being pressed against the opening edge portion 110, the side wall portion 332A is crimped in the horizontal direction (the radial direction) so as to bring the outer circumferential surface of the second engagement portion 402 into close contact with the first gasket 340. At the same time, as shown in FIG. 6C, the end portion 338 of the side wall portion 332A is brought into contact with the opening edge portion 110.

Second Embodiment

Figure 7:
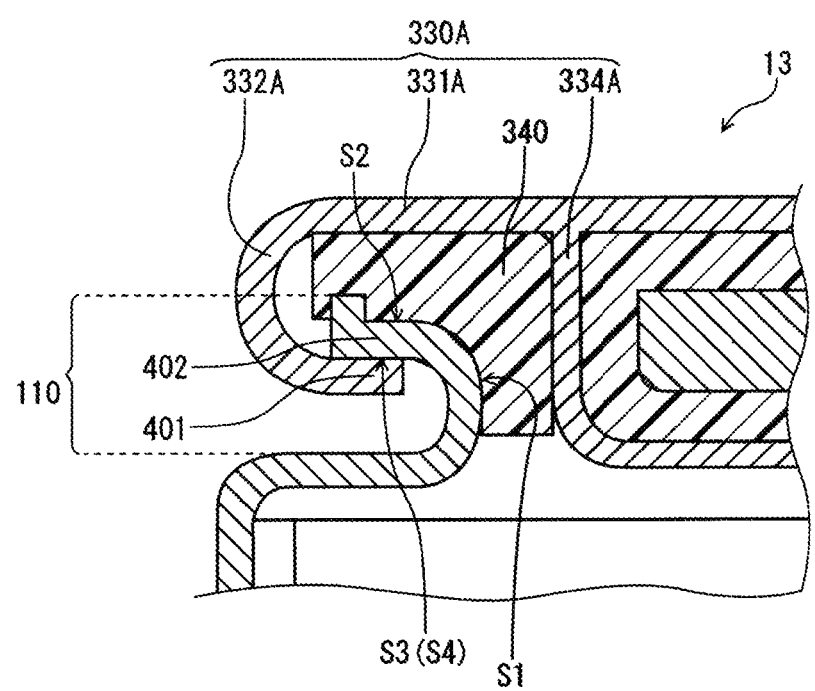
FIG. 7 is an enlarged schematic vertical cross sectional view of a relevant part of a battery, showing an embodiment of the battery according to the first aspect of the present disclosure.

FIG. 7 shows an embodiment of the battery according to the first aspect of the present disclosure, and is an enlarged schematic vertical cross sectional view of the vicinity of an opening edge portion 110 of a battery 13. As with the battery 10, the battery 13 shown in FIG. 7 is a cylindrical battery, and includes a bottomed cylindrical battery can 100, a cylindrical electrode body 200 that is housed in the can, and a sealing member 300A that seals an opening of the battery can 100.

In the battery 13, the opening edge portion 110 includes a projecting portion that is recessed in the radial direction and then bent outward and extends outward while having an inner circumferential surface (a second surface S2) that opposes the top plate portion 331A. With this projecting portion, a second engagement portion 402 is formed. Also, at an end portion of the projecting portion, a projection that protrudes toward the first gasket is formed. The first gasket 340 is compressed in the axial direction between the second surface S2 and the top plate portion 331A.

On the other hand, an end portion of a side wall portion 332A includes a protruding portion that is bent inward. With the projecting portion, a first engagement portion 401 is formed. The end portion (the first engagement portion 401) of the side wall portion 332A protrudes inward such that an inner circumferential surface of the side wall portion 332A faces upward. A surface (third surface S3) of the side wall portion 332A that faces upward is in contact with an outer surface (fourth surface S4) of the projecting portion of the opening edge portion 110 on the opposite side of the second surface S2, and thereby the side wall portion 332A is electrically connected to the cylinder portion 120.

The battery 13 may be produced by performing processing of bending an end portion of the side wall portion 332A inward, with the cap 330A being pressed against the cylinder portion 120 via the first gasket 340. Accordingly, with the first gasket 340 being compressed in the axial direction, at least a portion of the third surface is in contact with the fourth surface, and the side wall portion 332A and the cylinder portion 120 are electrically connected to each other. Due to the repulsive force of the first gasket 340, the electrical connection between the side wall portion 332A and the cylinder portion 120 is maintained.

Other structural elements of the battery 13 are the same as those of the battery 10.

Third Embodiment

Figure 8:
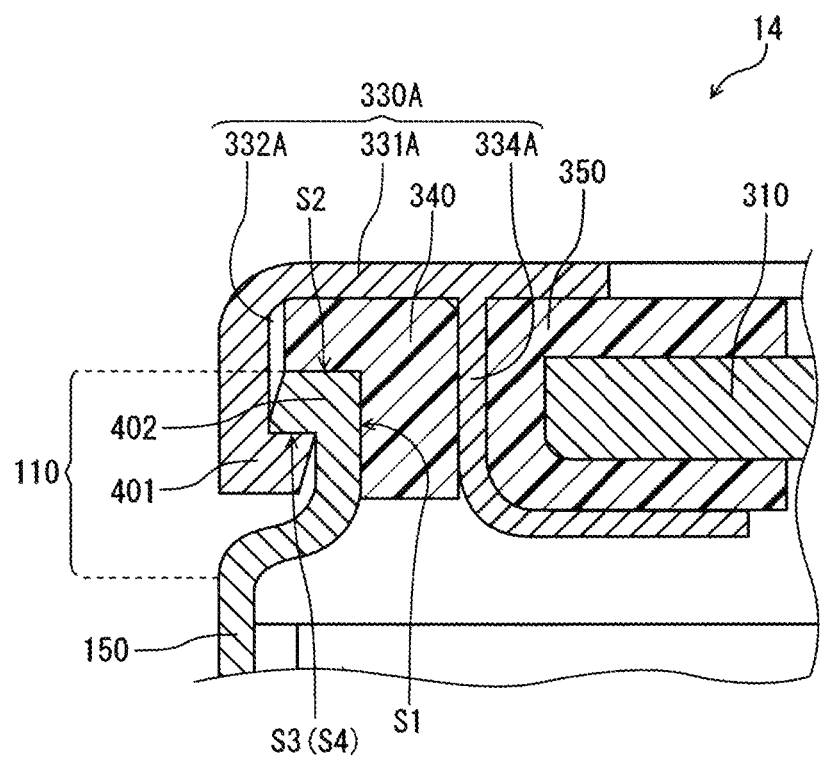
FIG. 8 is an enlarged schematic vertical cross sectional view of a relevant part of a battery, showing an embodiment of the battery according to the first aspect of the present disclosure.

FIG. 8 shows an embodiment of the battery according to the first aspect of the present disclosure, and is an enlarged schematic vertical cross sectional view of the vicinity of an opening edge portion 110 of a battery 14. As with the battery 10, the battery 14 shown in FIG. 8 is a cylindrical battery, and includes a bottomed cylindrical battery can 100, a cylindrical electrode body 200 that is housed in the can, and a sealing member 300A that seals an opening of the battery can 100.

In the battery 14, the opening edge portion 110 is recessed in the radial direction, and a claw-shaped projecting portion that protrudes outward is formed at an end portion of the opening edge portion 110. With this projecting portion, a second engagement portion 402 is formed. In the projecting portion that constitutes the second engagement portion 402, a protruding surface that opposes the side wall portion 332A and protrudes outward is inclined from a direction parallel to the axis such that the protruding surface on the bottom portion side protrudes more outward.

On the other hand, at an end portion of the side wall portion 332A as well, a claw-shaped projecting portion that protrudes inward is formed. With this projecting portion, a first engagement portion 401 is formed. In the projecting portion that constitutes the first engagement portion 401, a protruding surface that protrudes inward in the horizontal direction (the radial direction) is inclined from a direction parallel to the axis such that the protruding surface on the upper side protrudes more inward. Accordingly, as can be seen from FIG. 8, the first engagement portion 401 and the second engagement portion 402 constitute hooks in which one of the engagement portions engages the other.

The second engagement portion 402 includes a first surface S1 that is an inner surface of the cylinder portion 120 and a second surface S2 that is a side face of the projecting portion and opposes the top plate portion 331A. The first surface S1 and the second surface S2 are covered with the first gasket 340. The first gasket 340 is compressed in the axial direction between the second surface S2 and the top plate portion 331A.

The first engagement portion 401 includes a side face (third surface S3) of the projecting portion that opposes the top plate portion 331A, and the second engagement portion 402 includes a side face (fourth surface S4) of the projecting portion that opposes the bottom portion 130. The third surface S3 and the fourth surface S4 are in contact with each other, and the side wall portion 332A and the cylinder portion 120 are electrically connected to each other.

The battery 14 may be produced by pressing the cap 330A including the first engagement portion 401 against the cylinder portion 120 including the second engagement portion 402 via the first gasket 340. By pressing the cap until the third surface S3 of the first engagement portion 401 reaches a position lower than the fourth surface S4 of the second engagement portion 402, the first engagement portion 401 and the second engagement portion 402 are engaged with each other, with the first gasket 340 being compressed in the axial direction, and the cap 330A is fixed to the cylinder portion 120. At this time, at least a portion of the third surface is in contact with the fourth surface, and the side wall portion 332A and the cylinder portion 120 are electrically connected to each other. Due to the repulsive force of the first gasket 340 in the axial direction, the first engagement portion 401 and the second engagement portion 402 come into closer contact with each other. As a result, the electrical connection between the side wall portion 332A and the cylinder portion 120 is maintained. Also, the repulsive force functions as a fixing force that fixes the sealing member 300.

Other structural elements of the battery 14 are the same as those of the battery 10.

In the batteries 13 and 14, the supporting wall 335A is not provided, and the outer circumferential wall of the supporting portion 334A abuts against the first gasket 340. With this configuration, a dead space between the first gasket 340 and the second gasket 350 is reduced. Also, the supporting portion 334A can also function as the supporting wall 335A. However, in order to adjust the thickness of the first gasket, the supporting wall 335A may be provided on the outer circumferential side than the supporting portion 334A such that the first gasket 340 abuts against the outer circumferential wall of the supporting wall 335A.

Fourth Embodiment

Figure 9:
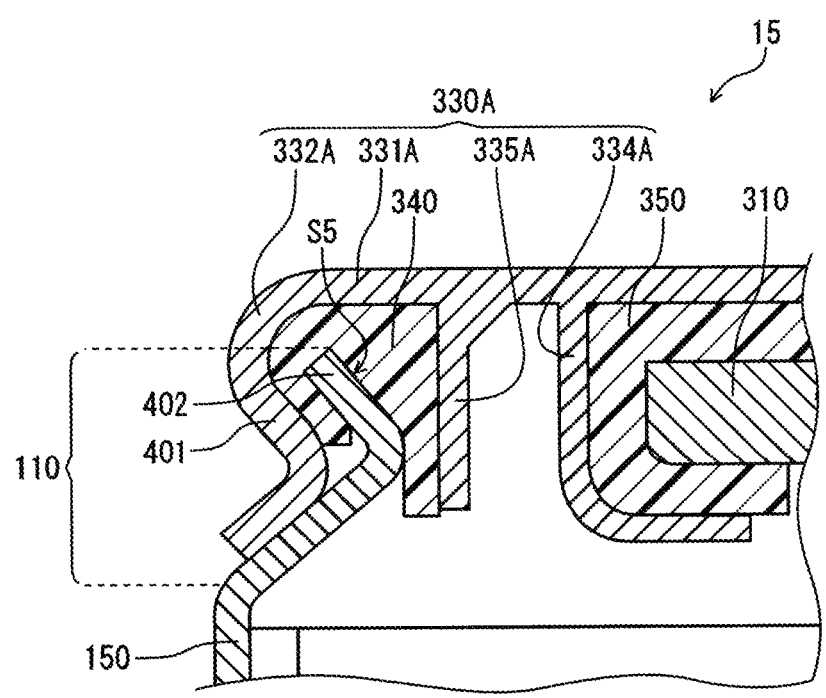
FIG. 9 is an enlarged schematic vertical cross sectional view of a relevant part of a battery, showing an embodiment of the battery according to the first aspect of the present disclosure.

FIG. 9 shows an embodiment of the battery according to the first aspect of the present disclosure, and is an enlarged schematic vertical cross sectional view of the vicinity of an opening edge portion 110 of a battery 15. As with the battery 10, the battery 15 shown in FIG. 9 is a cylindrical battery, and includes a bottomed cylindrical battery can 100, a cylindrical electrode body 200 that is housed in the can, and a sealing member 300A that seals an opening of the battery can 100.

In the battery 15, the opening edge portion 110 of a cylinder portion 120 is recessed in the radial direction, and then obliquely bent toward the outside of the cylinder portion 120, instead of extending in the axial direction, thereby forming a projecting portion extending toward the outside of the cylinder portion 120. With this projecting portion, a second engagement portion 402 is formed.

A first gasket 340 is provided in a space defined by an inner circumferential surface S5 of the obliquely bent projecting portion of the cylinder portion 120 (the opening edge portion 110), the top plate portion 331A, and the supporting wall 335A, and covers the inner circumferential surface S5. In this case, in the vicinity of the inner circumferential surface S5, the first gasket 340 is compressed in an oblique direction that is the normal direction of the inner circumferential surface S5. In other words, it can be said that the inner circumferential surface S5 functions as both the first surface S1 and the second surface S2 in the battery 10, and the first gasket 340 is compressed in the horizontal direction and the axial direction in the vicinity of the inner circumferential surface S5.

With the battery 15, it is possible to obtain advantageous effects that are the same as those of the battery 10 while simplifying the step of bending the cylinder portion 120 to form the opening edge portion 110.

Other structural elements of the battery 15 are the same as those of the battery 10.

Figure 10:
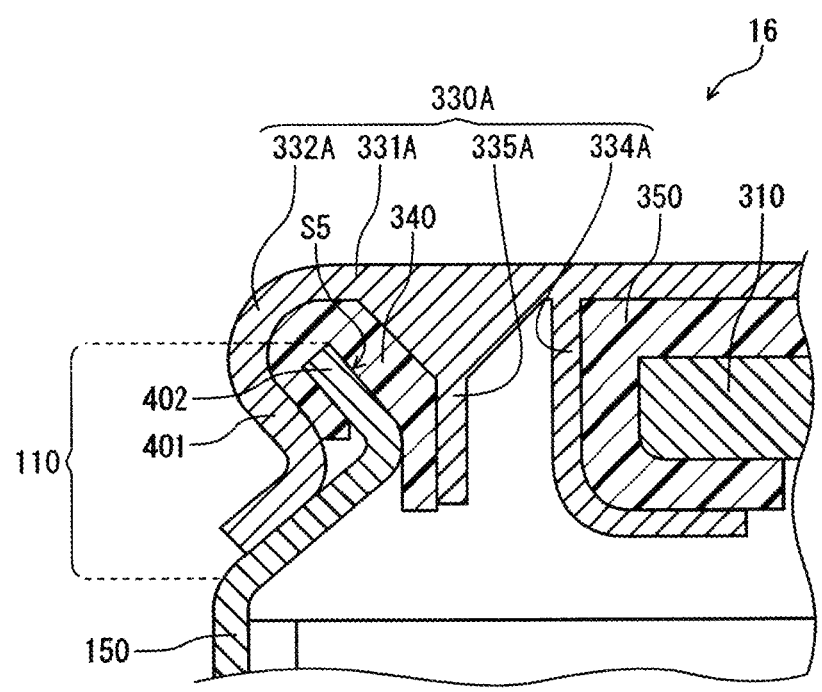
FIG. 10 is an enlarged schematic vertical cross sectional view of a relevant part of a battery, showing a variation of the battery shown in FIG. 9.

FIG. 10 shows a variation of the battery 15. FIG. 10 shows an embodiment of the battery according to the first aspect of the present disclosure, and is an enlarged schematic vertical cross sectional view of the vicinity of an opening edge portion 110 of a battery 16. In the battery 16, a portion of an outer circumferential surface of the supporting wall 335A is inclined along an inner circumferential surface S5 of a projecting portion that constitutes a second engagement portion 402.

As described above, a first gasket 340 is compressed in an oblique direction in the vicinity of the inner the circumferential surface S5. In the case of the battery 15 shown in FIG. 9, in a center portion of the inner circumferential surface S5, the thickness of the first gasket 340 in the compression direction (the distance between the inner circumferential surface S5 and the top plate portion 331A) is larger than that in an end portion of the projecting portion, and thus the compression ratio is likely to be low. Accordingly, depending on the position on the inner circumferential surface S5, the repulsive force of the first gasket 340 is not uniform, and the repulsive force of the first gasket 340 is likely to decrease.

However, with a configuration in which the outer circumferential surface of the supporting wall 335A is inclined along the inner circumferential surface S5, the thickness of the first gasket 340 in the compression direction is uniform, as a result of which, the compression force can be increased, and a region with a high compression force can be expanded. With this configuration, the repulsive force of the first gasket 340 can be increased, and sealing properties between the opening edge portion 110 and the cap 330A can be enhanced.

Also, an inner circumferential surface of the supporting wall 335A may be inclined such that one end of the inclined surface is connected to the top plate portion. By doing so, the supporting wall 335A is unlikely to be deformed due to the force in the horizontal direction.

Other structural elements of the battery 16 are the same as those of the battery 15.

In the embodiments given above, the aspects of the sealing members 300A that constitute the batteries 10 to 16, in particular, the aspects of the first engagement portions 401 and the second engagement portions 402 are merely examples. Where necessary, the structural elements of the sealing members 300A shown in the embodiments given above can be combined in any way.

In each of the embodiments given above, the first gasket 340 and the second gasket 350 are configured as separate members, but a configuration is possible in which the supporting portion 334A and the supporting wall 335A are omitted, the first gasket 340 and the second gasket 350 are formed as one continuous gasket, and the continuous gasket is used to seal the space between the opening edge portion 110 and the cap 330A and the space between the sealing plate 310 and the cap 330A.

Fifth Embodiment

Figure 11:
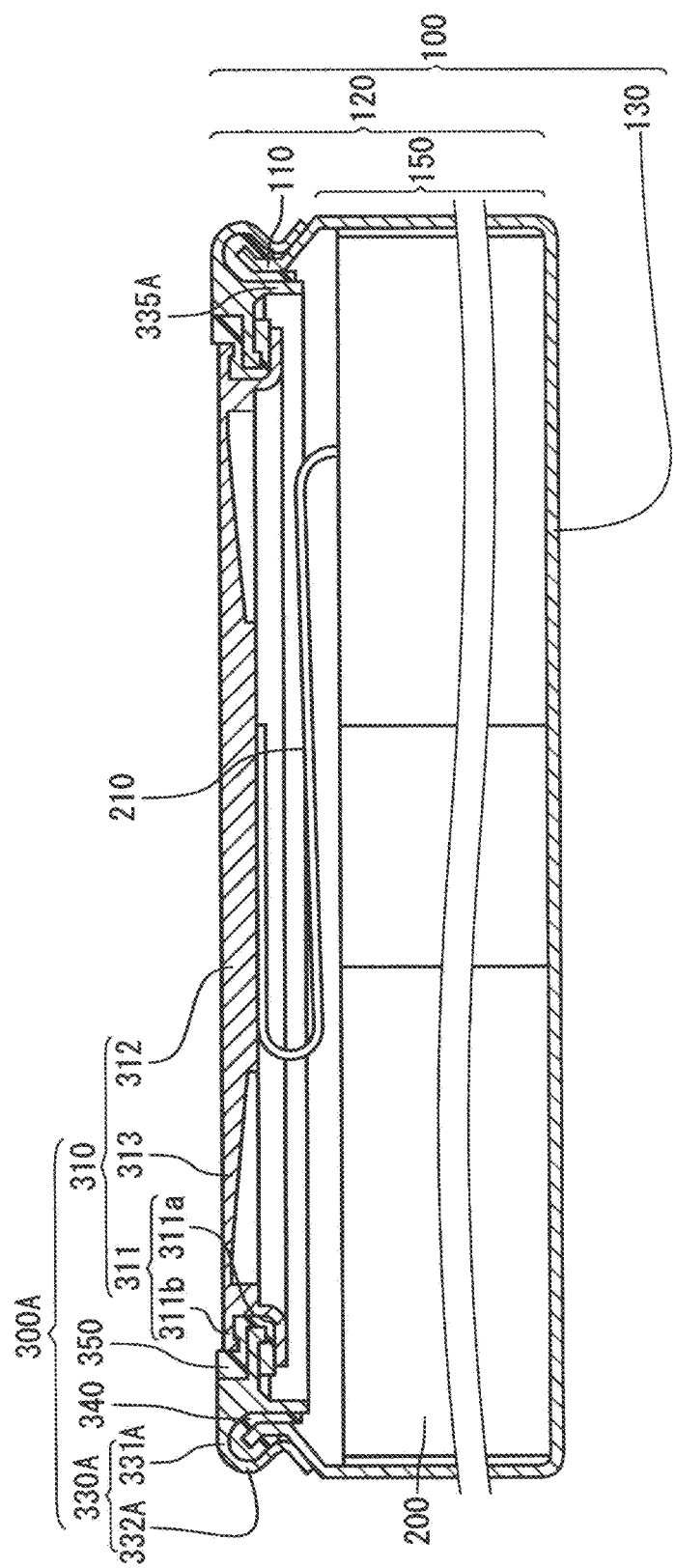
FIG. 11 is a schematic vertical cross sectional view showing an embodiment of the battery according to the first aspect of the present disclosure.

FIG. 11 is a schematic vertical cross sectional view showing an embodiment of the battery according to the first aspect of the present disclosure. A battery 17 shown in FIG. 11 is different from the battery 11 in that the aspects of the sealing plate 310 and the second gasket 350 are changed. An illustration of the first external lead wire 501 and the second external lead wire 502 is omitted.

A sealing plate 310 includes a circumferential edge portion 311, a center region 312, and a thin portion 313. The thin portion 313 is formed such that the thickness decreases from the center region 312 toward the circumferential edge portion 311 and is thinnest at a position at which the thin portion 313 is connected to the circumferential edge portion 311. The outer surfaces of the circumferential edge portion 311, the center region 312, and the thin portion 313 are substantially coplanar.

The circumferential edge portion 311 includes an inner circumferential edge portion 311a that is disposed on a bottom portion 130 side (on the inner side) and an outer circumferential edge portion 311b that has an outer surface and is disposed on a side (on the outer side) opposite to the bottom portion 130 side. The inner circumferential edge portion 311a and the outer circumferential edge portion 311b sandwich a second gasket 350 in the axial direction, the second gasket 350 covering the top plate portion 331A of the cap 330A. With this configuration, the space between the sealing plate 310 and the top plate portion 331A is sealed while the sealing plate 310 and the top plate portion 331A are insulated from each other.

The circumferential edge of the outer circumferential edge portion 311b includes a projection that protrudes toward the second gasket 350 on the bottom portion 130 side. As a result of the second gasket 350 being pressed by the projection, a significantly high seal stress can be obtained. Likewise, a projection that protrudes toward the second gasket 350 may also be formed at the edge of the through hole of the top plate portion 331A. In the example shown in FIG. 11, a projection that protrudes toward the second gasket 350 on the bottom portion 130 side is provided on an inner surface that is located at the inner circumferential edge portion of the top plate portion 331A and opposes the bottom portion 130.

The sealing plate 310 can be fixed to the cap 330A by, for example, inserting the sealing plate 310 in which the inner circumferential edge portion 311a extends vertically relative to the center region 312 into the through hole of the top plate portion 331A together with the second gasket 350, and thereafter, crimping a portion of the vertically extending inner circumferential edge portion 311a outward in the radial direction to form the inner circumferential edge portion 311a extending outward in the radial direction. At this time, an end portion of the second gasket 350 that is on the electrode body side may be bent when the circumferential edge portion 311 is crimped to form the inner circumferential edge portion 311a so as to be provided between the inner circumferential edge portion 311a and the top plate portion 331A.

Other structural elements of the battery 17 are the same as those of the battery 10.

The aspects of the sealing plate 310 and the second gasket 350 of the battery 17 and the method for sealing the space between the sealing plate 310 and the top plate portion 331 may be applied to the batteries 11 to 16.

[Second Aspect]

A battery according to a second aspect of the present disclosure includes: a battery can that includes a cylinder portion that has a circular cylindrical shape, a bottom portion that closes one end portion of the cylinder portion, and an opening edge portion at the other end portion of the cylinder portion; an electrode body that is housed in the cylinder portion; a sealing member that is fixed to an inner side of the opening edge portion to seal an opening of the opening edge portion; and a sealing agent provided between the sealing member and the opening edge portion. The sealing member includes: a sealing plate that is electrically connected to one of electrodes included in the electrode body; and a cap that is connected to the sealing plate while being insulated from the sealing plate. The cap includes: a ring-shaped top plate portion that extends outward from a circumferential edge of the sealing plate in a radial direction of the cylinder portion, and in which a through hole is formed in an axial direction of the cylinder portion; and a side wall portion that extends vertically on a circumferential edge of the top plate portion in a direction away from the bottom portion in the axial direction of the cylinder portion, and opposes an inner circumferential surface of the opening edge portion. The sealing plate is provided to close the through hole of the top plate portion. The battery can and the cap are electrically connected to the other electrode of the electrode body. The sealing agent is provided in a portion of a space between the side wall portion and the opening edge portion, and seals the space between the side wall portion and the opening edge portion.

Sixth Embodiment

Figure 12:
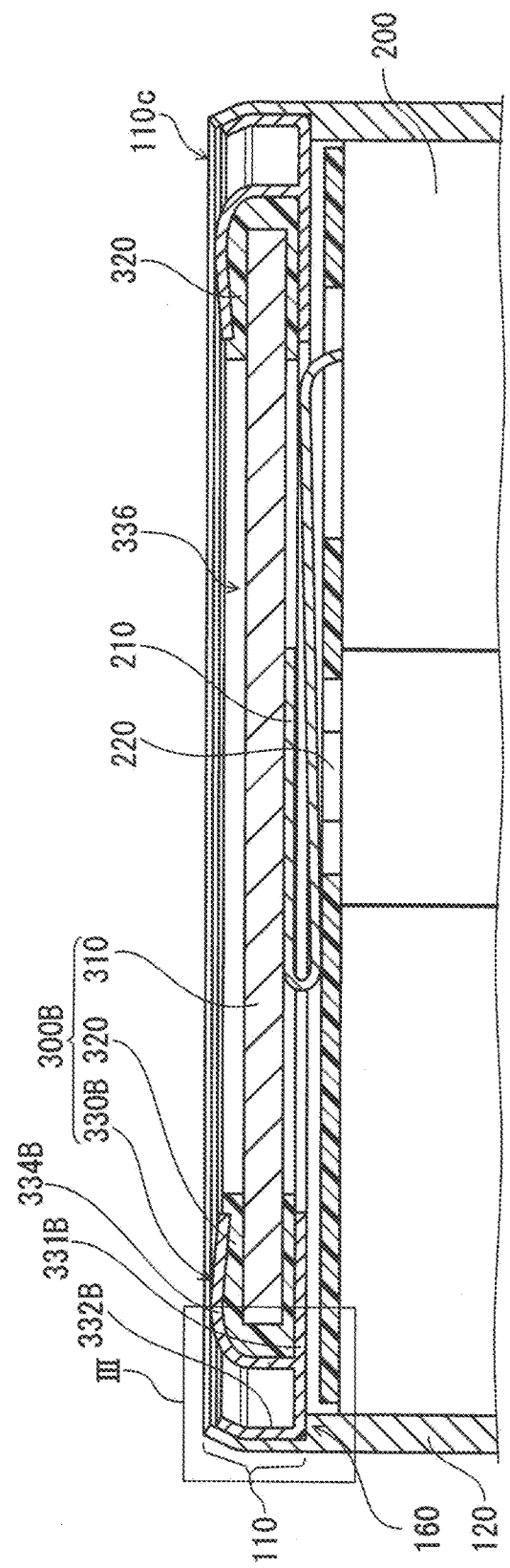
FIG. 12 is a schematic vertical cross sectional view of an opening edge portion side, showing an embodiment of a battery according to a second aspect of the present disclosure.
Figure 13:
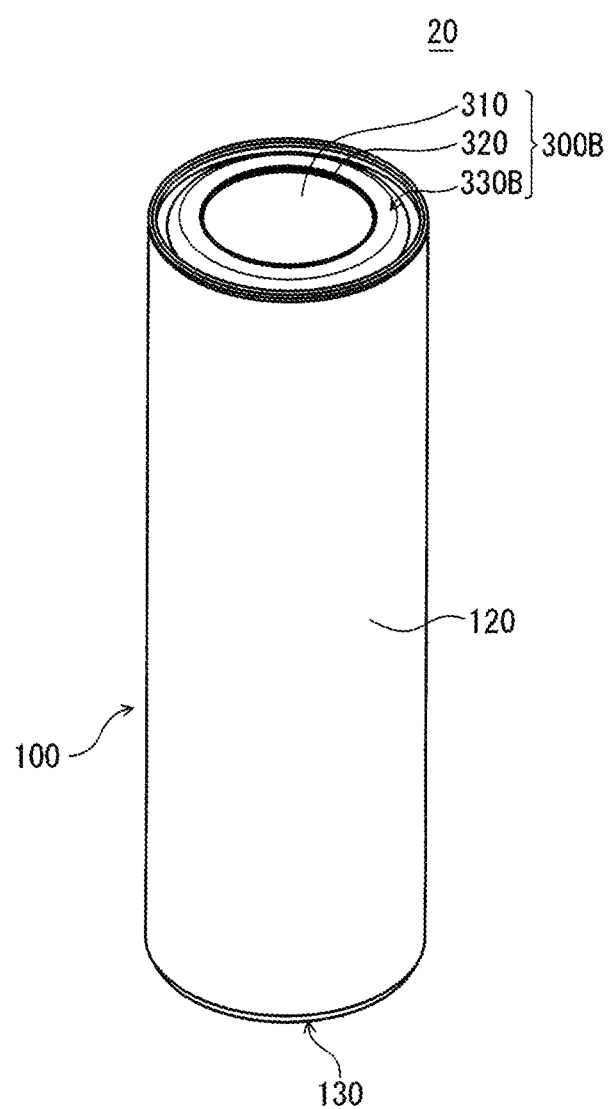
FIG. 13 is a perspective view showing an outer appearance of the battery shown in FIG. 12.
Figure 14:
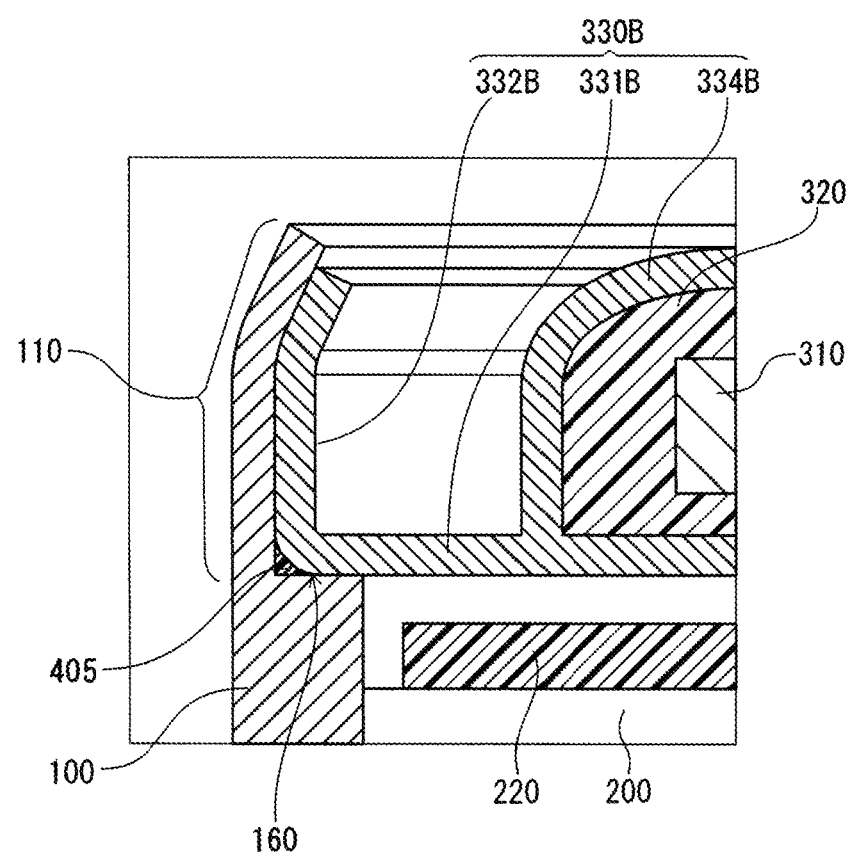
FIG. 14 is an enlarged view of a region III shown in FIG. 12.

FIG. 12 is a schematic vertical cross sectional view showing an embodiment of the battery according to the second aspect of the present disclosure, and FIG. 13 is a perspective view of the battery. FIG. 14 is an enlarged view of a region III of a battery 20 shown in FIG. 12. FIG. 12 is a schematic vertical cross sectional view of an upper side (sealing member side) of the battery 20 shown in FIG. 13.

The battery 20 includes a battery can 100, an electrode body 200 housed in the battery can 100, and a sealing member 300B that seals an opening 110c of the battery can 100. The battery can 100 includes a cylinder portion 120 that has a circular cylindrical shape, a bottom portion 130 that closes a lower end portion of the cylinder portion 120, and an opening edge portion 110 that is provided in a predetermined portion on upper end portion side (opening 110c side) of the cylinder portion 120. The electrode body 200 is housed in the cylinder portion 120 of the battery can 100. The sealing member 300B includes: a sealing plate 310 that is electrically connected to one of electrodes included in the electrode body 200 via an inner lead wire 210; and a cap 330B that is electrically connected to the other electrode of the electrode body 200 and the battery can 100. An insulating gasket 320 (third gasket) is provided between the sealing plate 310 and the cap 330B, and thereby insulation between the sealing plate 310 and the cap 330B is ensured. The sealing member 300B is fixed to the inner side of the opening edge portion 110 so as to seal the opening 110c of the cylinder portion 120. An insulating plate (upper insulating plate) 220 is provided between the sealing member 300B and the electrode body 200.

The cap 330B of the sealing member 300B includes a ring-shaped top plate portion 331B that has a through hole 336 formed in the axial direction (or in other words, the thickness direction of the top plate portion 331B), and includes a side wall portion 332B provided on a circumferential edge of the top plate portion 331B. The sealing plate 310 is placed to close the through hole 336 of the top plate portion 331B. The top plate portion 331B extends outward from the circumferential edge of the sealing plate 310 in the radial direction of the cylinder portion 120. The side wall portion 332B extends vertically on the circumferential edge of top plate portion 331B in a direction (upward direction) away from the bottom portion 130 of the battery can 100 in the axial direction of the cylinder portion 120, and opposes an inner circumferential surface of the opening edge portion 110. In FIGS. 12 and 14, the top plate portion 331B includes a supporting portion 334B that extends to stand vertically on the inner side than the side wall portion 332B in the radial direction. The supporting portion 334B may be formed unitarily with the top plate portion 331B, or the supporting portion 334B may be formed separately from the top plate portion 331B, and combined with the top plate portion 331B. The supporting portion 334B is an annular wall portion, and is bent inward in the radial direction of the cylinder portion 120. As a result of the supporting portion 334B being bent, a concave portion is formed on the top plate portion 331B, and the circumferential edge of the sealing plate 310 is received by the concave portion. An upper surface of the bent portion of the supporting portion 334B is flat, and is exposed from the opening 110c of the cylinder portion 120. The supporting portion 334B does not necessarily need to be a complete annular shape, and a plurality of supporting portions 334B may be disposed intermittently.

The shape of the top plate portion 331B is not limited to the shape described above as long as it is possible to hold the sealing plate 310 while being insulated from the sealing plate 310. From the viewpoint of holding the circumferential edge of the sealing plate 310, the top plate portion 331B preferably includes a concave portion, but the configuration is not limited thereto. The supporting portion 334B does not necessarily need to extend vertically on the upper side of the top plate portion 331B as shown in FIGS. 12 and 14, and may extend vertically on the lower side of the top plate portion 331B. However, from the viewpoint of reducing the volume of the sealing member 300B, it is advantageous that the supporting portion 334B extends vertically on the upper side.

A sealing agent 405 is provided in a portion of a space between the side wall portion 332B of the cap 330B and the opening edge portion 110 of the battery can 100 (more specifically, the inner circumferential surface of the opening edge portion 110), and seals the space between the side wall portion 332B and the opening edge portion 110. In this way, by using the cap 330B and sealing the space between the cap 330B and the opening edge portion 110 with the sealing agent 405, the volume of the portion above the electrode body 200 can be reduced while ensuring airtightness of the battery. For this reason, in the battery 20, it is unnecessary to form an annular groove portion in a region between the end portion of the cylinder portion 120 on the opening 110c side and the electrode body 200. The annular groove portion described above is usually formed to protrude inward in the radial direction from the outer circumferential surface of the cylinder portion 120.

Also, the outer diameter of the cap 330B is adjusted according to the inner diameter of the opening edge portion 110 such that the cap 330B can be fitted into the opening edge portion 110. By applying a flowable sealing agent 405 to the outer circumferential surface of the side wall portion 332B of the cap 330B and/or the inner circumferential surface of the opening edge portion 110, and inserting the sealing member 300B into the opening 110c of the cylinder portion 120, the cap 330B is press-fitted, and thus the airtightness can be further enhanced.

In FIGS. 12 and 14, the cylinder portion 120 includes a step portion 160 formed at an end portion (lower end portion) of the opening edge portion 110 on the bottom portion 130 side. The step portion 160 is formed as a result of the thickness of the opening edge portion 110 being reduced relative to the thickness of a portion (the portion being on the lower side of the opening edge portion 110) of the cylinder portion 120 excluding the opening edge portion 110. The cap 330B is placed on the step portion 160. The step portion 160 prevents the cap 330B from being inserted further into the cylinder portion 120. From the viewpoint of ensuring a higher level of airtightness, in the case where the cylinder portion 120 includes the step portion 160, it is preferable that the sealing agent 405 is also provided between the step portion 160 and cap 330B Also, in FIGS. 12 and 14, the side wall portion 332B is bent toward the inner side (the inner side in the radial direction) of the cylinder portion 120 together with the opening edge portion 110 of the cylinder portion 120. With this configuration, a higher level of airtightness is ensured, and the pressure resistance can be increased. Also, the reliability of electrical connection between the opening edge portion 110 and the side wall portion 332B can be enhanced. The end portion of the cylinder portion 120 on the opening edge portion 110 side and the vicinity thereof (and also the upper end portion of the side wall portion 332B, where necessary) may be bent inward into a flange. However, the configuration is not limited thereto, and the upper end portion of the side wall portion 332B and the upper end portion of the opening edge portion 110 do not necessarily need to be bent as long as sealing between the side wall portion 332B and the opening edge portion 110 is ensured.

The battery 20 can be produced by housing the electrode body 200 and an electrolyte into the cylinder portion 120 of the battery can 100, applying the sealing agent 405 to a portion of a region where the opening edge portion 110 of the battery can 100 and the cap 330B of the sealing member 300B oppose each other, and inserting the sealing member 300B into the opening edge portion 110. The sealing agent 405 may be applied before the electrode body 200 and the electrolyte are housed into the battery can 100 or after the electrode body 200 and/or the electrolyte are/is housed into the battery can 100. Where necessary, the end portion of the opening edge portion 110 on the opening 110c side may be bent inward in the radial direction of the cylinder portion 120 together with the side wall portion 332B of the cap 330B. Also, where necessary, the sealing agent 405 may be cured at an appropriate timing after the sealing agent 405 has been applied.

Figure 15A:
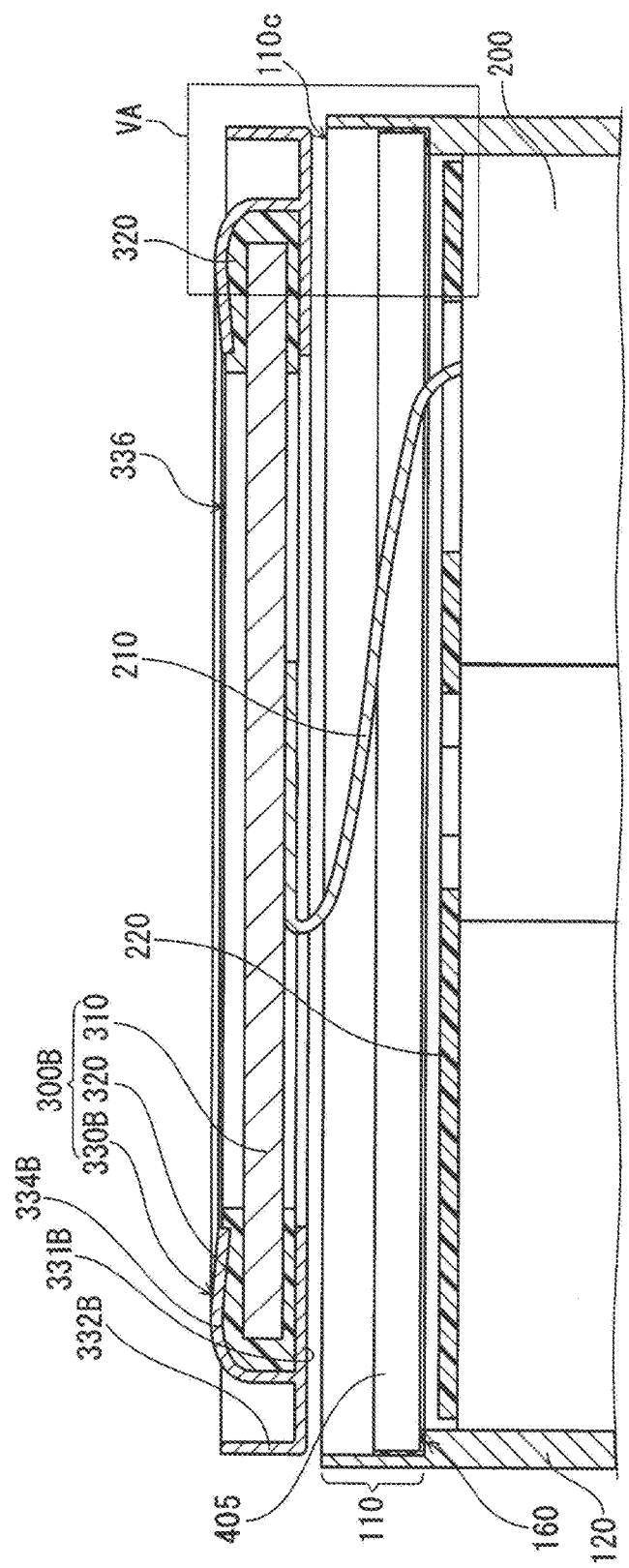
FIG. 15A is a schematic vertical cross sectional view of the opening edge portion side of the battery shown in FIG. 12 before an opening of the battery can is sealed with a sealing member.
Figure 15B:
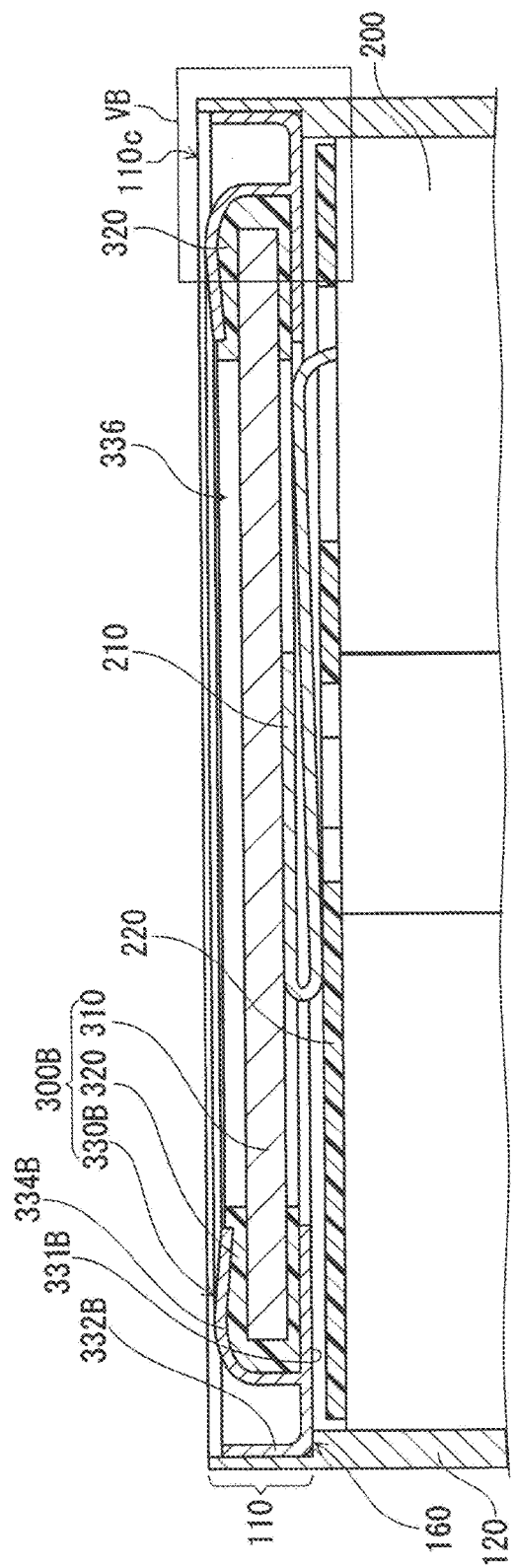
FIG. 15B is a schematic vertical cross sectional view of the opening edge portion side, showing a state in which the sealing member shown in FIG. 15A is inserted into the opening of the battery can.
Figure 15C:
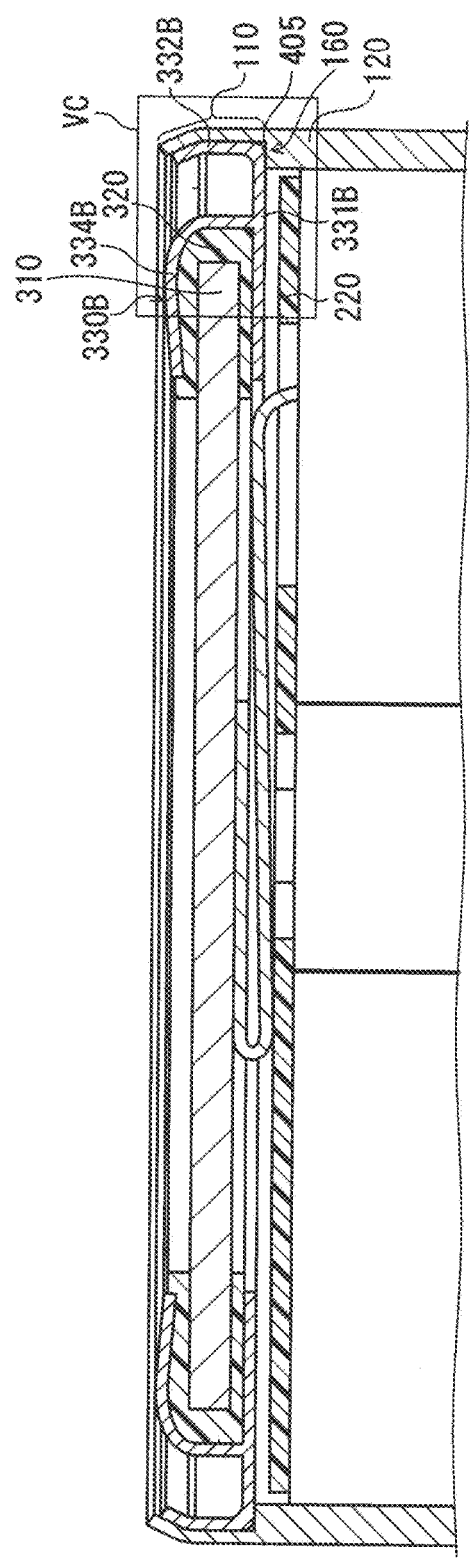
FIG. 15C is a schematic vertical cross sectional view of the opening edge portion side, showing a state in which the opening edge portion of the battery can shown in FIG. 15B and an opening-side end portion of a side wall portion of a cap of the sealing member are bent.
Figure 16A:
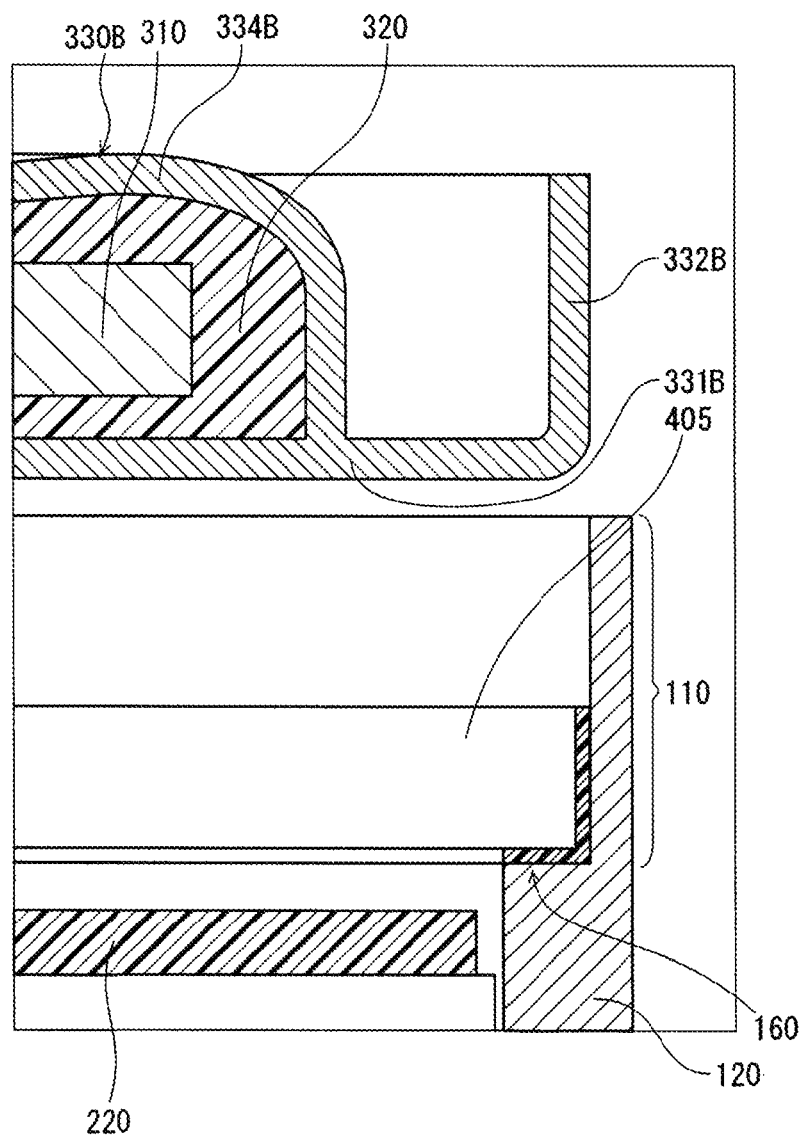
FIG. 16A is an enlarged view of a region VA shown in FIG. 15A.
Figure 16B:
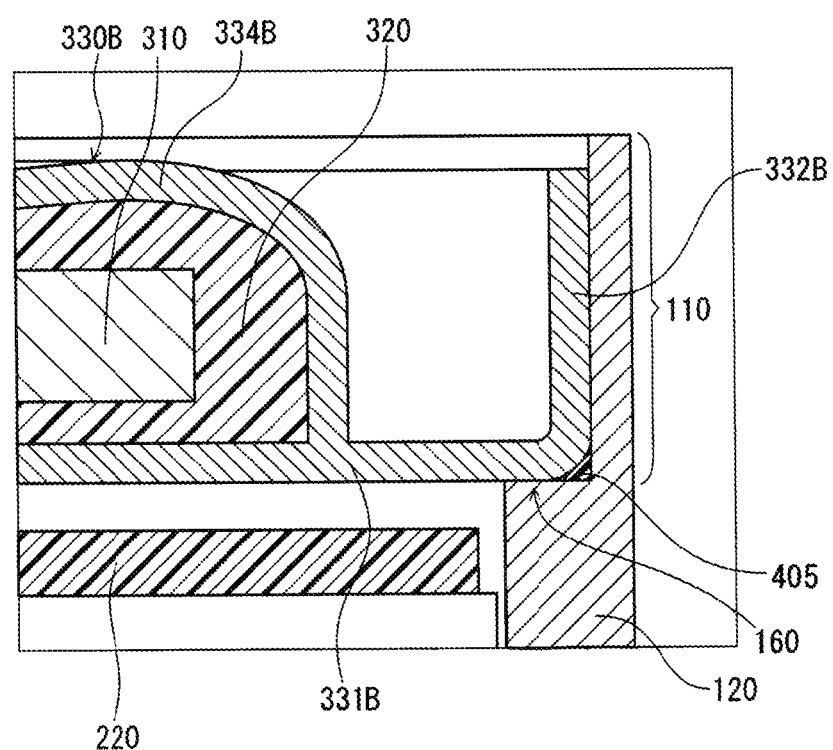
FIG. 16B is an enlarged view of a region VB shown in FIG. 15B.
Figure 16C:
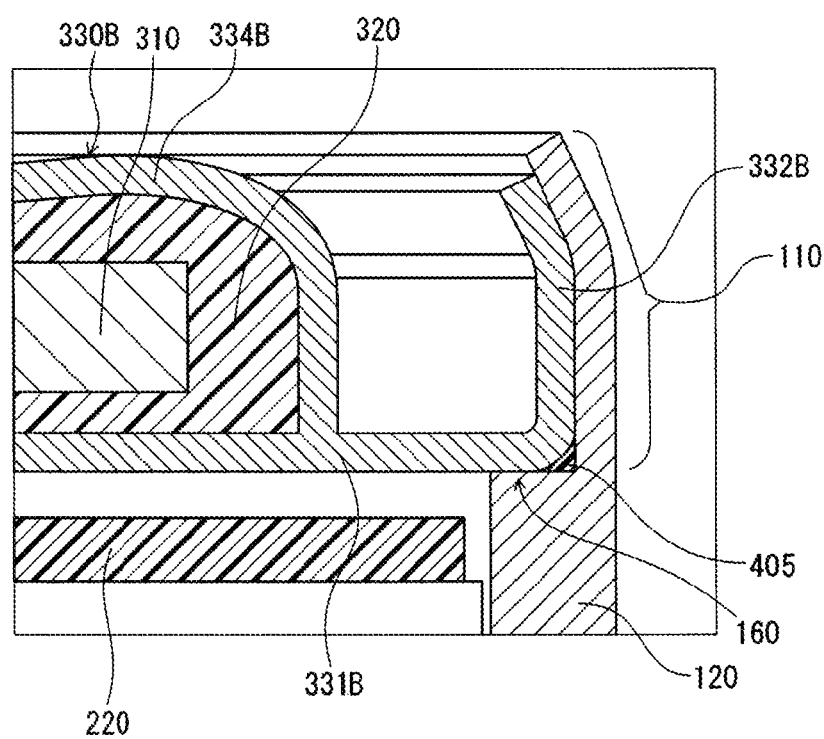
FIG. 16C is an enlarged view of a region VC shown in FIG. 15C.

FIGS. 15A to 15C are schematic cross sectional views of the battery on the opening edge portion 110 side, showing how the battery can 100 is sealed using the sealing member 300B. FIGS. 16A to 16C are enlarged views of relevant parts shown in FIGS. 15A to 15C, respectively.

Prior to inserting the sealing member 300B into the opening 110c of the cylinder portion 120, the sealing agent 405 is applied to a region of the inner circumferential surface of the opening edge portion 110 of the cylinder portion 120 on the electrode body 200 side and an upper surface of the step portion 160 (FIGS. 15A and 16A). In this state, the sealing member 300B is inserted into the opening 110c of the cylinder portion 120 (FIGS. 15B and 16B). By doing so, the sealing agent 405 is provided between the side wall portion 332B of the cap 330B and the opening edge portion 110 and between the step portion 160 and the cap 330B. Then, the side wall portion 332B is bent inward in the radial direction of the cylinder portion 120 together with the opening edge portion 110 (FIGS. 15C and 16C). As a result of the side wall portion 332B and the opening edge portion 110 being bent, the pressure resistance can be increased, and the reliability of electrical connection between the side wall portion and the opening edge portion can be enhanced.

As the sealing agent 405, for example, any known sealing agent used for batteries can be used. The sealing agent 405 is preferably a material (coating material or the like) that is flowable at room temperature (20 to 35° C.). However, the sealing agent 405 may be solidified material of a flowable material after sealing of the battery 20. The flowable material may contain a solvent (an organic solvent or the like). Examples of the sealing agent 405 include polybutene, blown asphalt, straight asphalt, asphalt pitch, tar pitch, thermosetting resin, photocurable resin, and the like. As the sealing agent 405, these may be used singly or in a combination of two or more. Also, the sealing agent 405 does not necessarily need to be insulative. For example, conductive particles may be contained in the above-described material to form conductive paths via the sealing agent 405 between the side wall portion and the opening edge portion.

It is sufficient that the sealing agent 405 is provided in a portion of a region where the cap 330B and the cylinder portion 120 oppose each other. The sealing agent 405 is preferably provided in an end portion on the electrode body side in the axial direction in the region where the cap 330B and the cylinder portion 120 oppose each other. Also, the sealing agent 405 may be provided to cover at least the outer circumferential surface of the side wall portion 332B and/or the inner circumferential surface of the cylinder portion 120, in the shape of a ring with a predetermined height, in the region where the cap 330B and the cylinder portion 120 oppose each other. From the viewpoint of ensuring electrical connection between the cap 330B and the cylinder portion 120, the predetermined height is preferably smaller than the height of the opening edge portion 110. In the case where the cylinder portion 120 includes the step portion 160, from the same viewpoint, the sealing agent 405 is preferably provided in at least a portion of a region where the step portion 160 and the cap 330B oppose each other.

The thickness of the sealing agent 405 is, for example, 200 µm or less, and may be 100 µm or less. The thickness of the sealing agent 405 is, for example, 20 µm or more. The thickness of the sealing agent 405 can be determined based on an X ray image of the battery 20.

Other structural elements of battery 20 are not particularly limited. Structural elements that are the same as those of the batteries 10 to 17 or known structural elements may be used.

As with the battery 10 or the battery 17, a sealing plate 310 that includes a circumferential edge portion 311, a center region 312, and a thin portion 313 may be used.

[Third Aspect]

A battery according to a third embodiment of the present disclosure includes: a battery can that includes a cylinder portion that includes an opening edge at one end portion of the cylinder portion and a bottom portion that closes the other end portion of the cylinder portion; an electrode body that is housed in the cylinder portion; and a sealing member that is fixed to the battery can to seal an opening of the battery can. The sealing member includes: a sealing plate; a cap that extends outward from an outer circumferential edge of the sealing plate and is connected to the sealing plate while being electrically insulated from the sealing plate; and a gasket that seals a space between an inner circumferential surface of the cylinder portion and the sealing plate. The cap includes a ring-shaped top plate portion that opposes the opening edge in the axial direction of the cylinder portion; and a cylindrical side wall portion that extends from an outer circumferential edge of the top plate portion toward the bottom portion and covers an outer circumferential surface of the cylinder portion on the opening edge side. The side wall portion presses the cylinder portion and the gasket in a direction from an outer circumferential surface toward an inner circumferential surface of the side wall portion, and is electrically connected to the battery can. The gasket is provided between the sealing plate and the inner circumferential surface of the cylinder portion in a compressed state.

Seventh Embodiment

Figure 17:
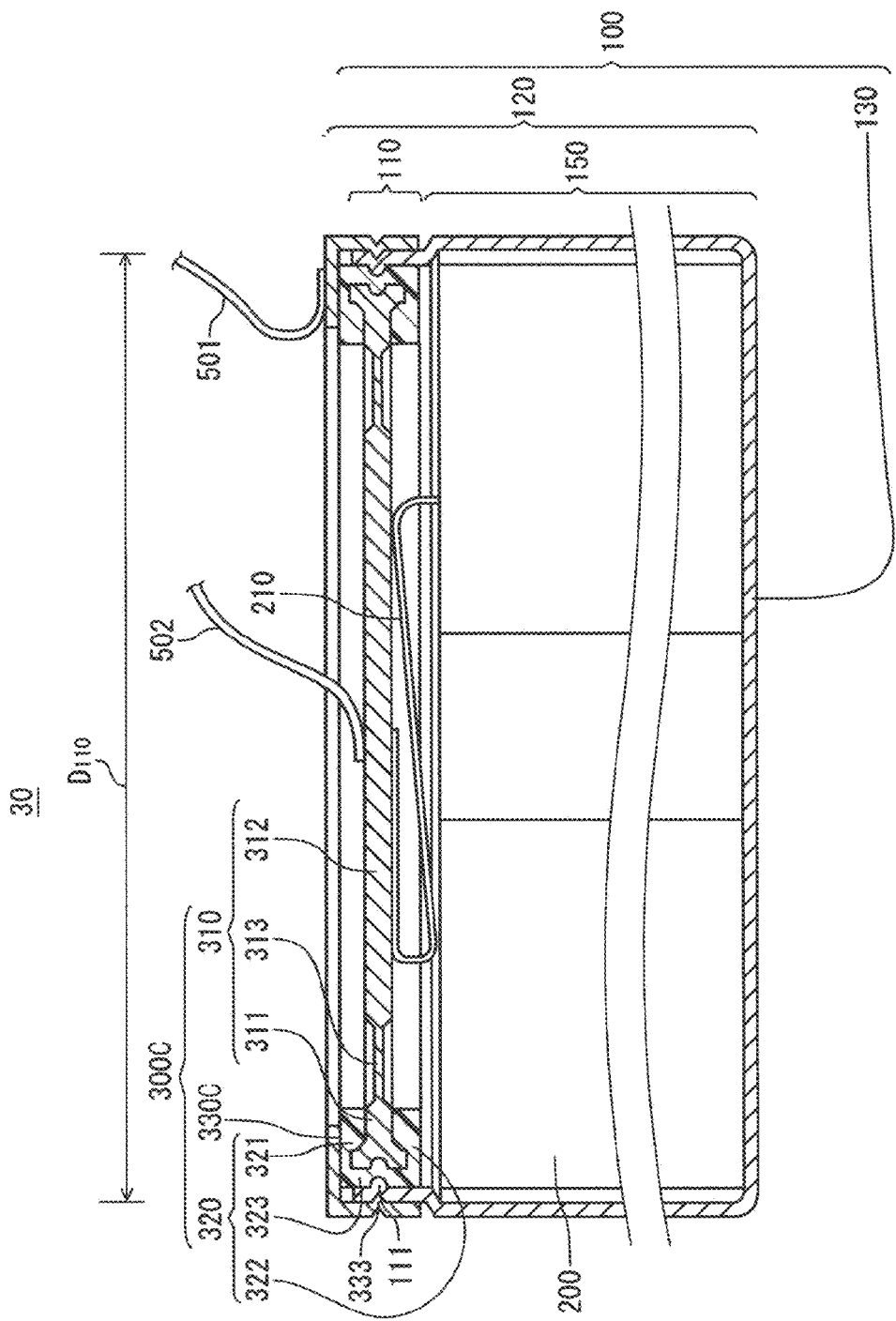
FIG. 17 is a schematic vertical cross sectional view showing an embodiment of a battery according to a third aspect of the present disclosure.
Figure 18:
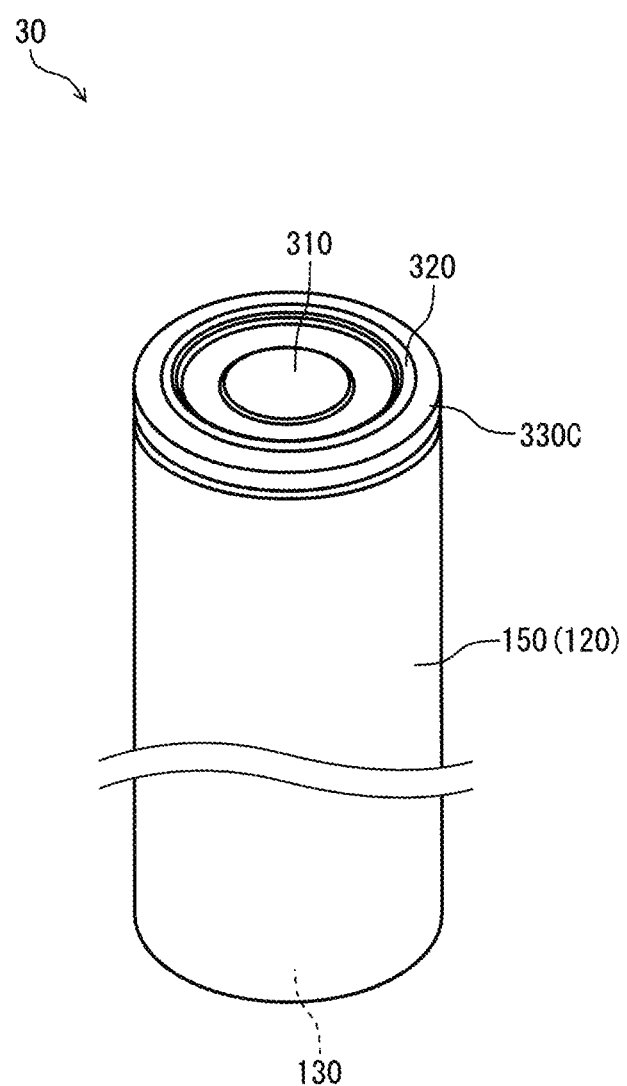
FIG. 18 is a perspective view showing an outer appearance of a battery can of the battery.
Figure 19:
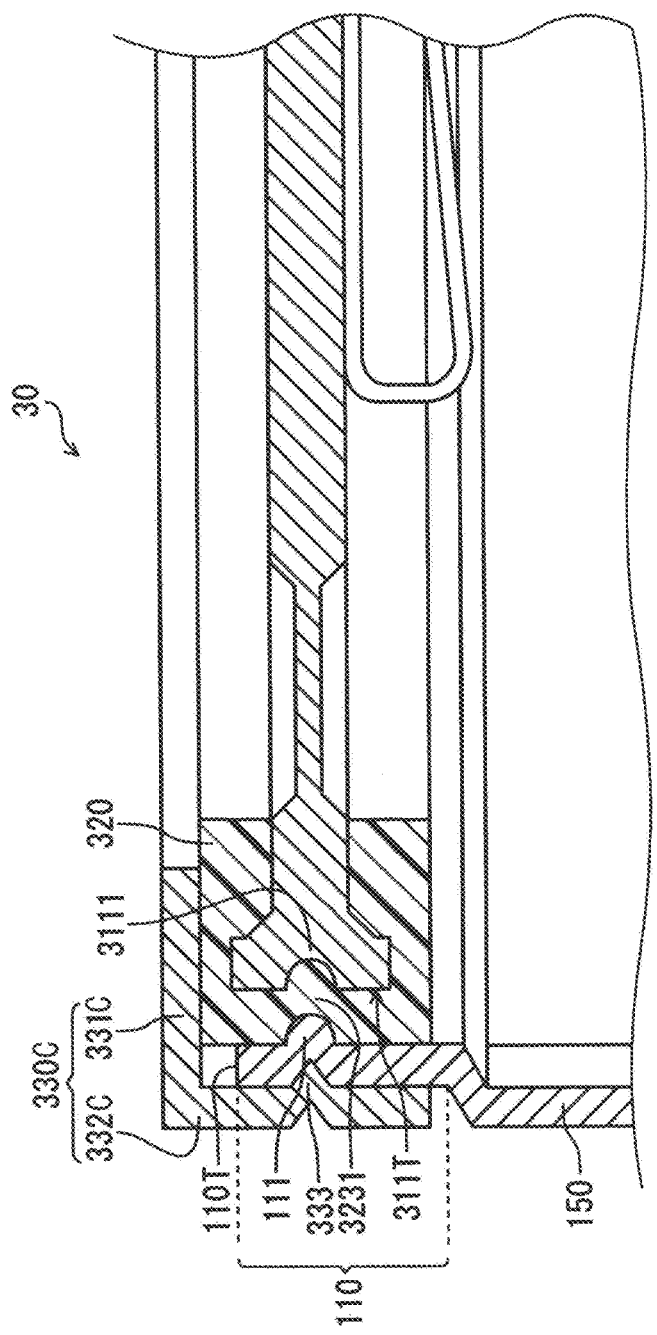
FIG. 19 is an enlarged schematic vertical cross sectional view of a relevant part of the battery shown in FIG. 17.

FIG. 17 is a schematic vertical cross sectional view showing an embodiment of the battery according to the third aspect of the present disclosure, and FIG. 18 is a perspective view of the battery. FIG. 19 is an enlarged schematic vertical cross sectional view of the vicinity of an opening edge portion 110 in a battery 30 shown in FIG. 17.

The battery 30 is a cylindrical battery, and includes a bottomed cylindrical battery can 100, a cylindrical electrode body 200 that is housed in the can, and a sealing member 300C that seals an opening of the battery can 100.

The battery can 100 includes a cylinder portion 120 that houses the electrode body 200 and a bottom portion 130. The cylinder portion 120 includes an opening edge at one of end portions of the cylinder portion 120, and the other end portion is closed by the bottom portion 130. The cylinder portion 120 includes a housing portion 150 that houses the electrode body and a non-housing portion in which the electrode body is not housed. At least a portion of the non-housing portion constitutes the opening edge portion 110. The opening of the battery can 100 is closed by the sealing member 300C.

The sealing member 300C includes a sealing plate 310, a gasket 320 (fourth gasket) provided on a circumferential edge portion 311 of the sealing plate 310, and a cap 330C. Other structural elements of the sealing plate 310 are the same as those of the battery 10 of the first aspect.

The gasket 320 includes an outer ring portion 321, an inner ring portion 322, and a relay ring portion 323 that connects the outer ring portion 321 and the inner ring portion 322, and seals a space between the inner circumferential surface of the cylinder portion 120 and the sealing plate 310. An end face 311T of the circumferential edge portion 311 of the sealing plate 310 is covered with the relay ring portion 323.

The outer ring portion 321, the inner ring portion 322, and the relay ring portion 323 are formed as an integrally molded body. The gasket 320 may be integrally molded with the sealing plate 310 by means of, for example, insert molding.

By performing integral molding, a state in which the sealing plate 310 and the gasket 320 closely adhere to each other can be easily achieved. Also, as a result of the sealing plate 310 and the gasket 320 being integrally molded, the sealing plate 310 and the gasket 320 can be handled as one component, and thus the production of the battery 30 can be facilitated.

The cap 330C includes a ring-shaped top plate portion 331C and a cylindrical side wall portion 332C. The cap 330C is electrically insulated from the sealing plate 310 by the gasket 320. The side wall portion 332C extends from an outer circumferential edge of the top plate portion 331C toward the bottom portion 130, and covers an outer circumferential surface of the opening edge portion 110 of the cylinder portion 120.

The cap 330C is electrically conductive, and has the same polarity as that of the battery can 100. Accordingly, the cap 330C can function as the other terminal that has a polarity different from that of the sealing plate 310. For this reason, electric current generated in both electrodes of the battery 30 can be collected from an upper surface of the sealing member 300C. For example, a configuration is possible in which a first external lead wire 501 is connected to the top plate portion 331C of the cap 330C, and a second external lead wire 502 is connected to an outer surface of a center region 312 of the sealing plate 310.

The opening edge portion 110 has an open end and is continuous with the housing portion 150. The opening edge portion 110 is not in contact with the top plate portion 331C of the cap 330C, and thus there is a space between an end portion 110T of the opening edge portion 110 and an inner surface of the top plate portion 331C. In this case, the top plate portion 331C is in contact only with the gasket 320, and thus the top plate portion 331C can be easily leveled when the cap 330C is pressed downward into the battery can. Accordingly, the first external lead wire 501 can be easily connected to the top plate portion 331C.

At least a portion of the side wall portion 332C of the cap 330C presses the relay ring portion 323 of the gasket 320 against the end face 311T of the circumferential edge portion 311 of the sealing plate 310 via the opening edge portion 110 and thereby compresses the relay ring portion 323. By doing so, sealing properties between the cylinder portion 120 and the sealing member 300C are ensured. For example, the cap 330C presses the gasket 320, instead of in the axial direction of the cylinder portion 120 of the battery can, in a direction (also referred to as "radial direction" or "horizontal direction") perpendicular to the axial direction. In this case, when the pressing force of the cap 330C pressing the gasket 320 is resolved in the axial direction and the radial direction, vectors in the radial direction have a scalar quantity higher than that of vectors in the axial direction.

In the inner circumferential surface of the side wall portion 332C of the cap 330C, a projection 333 that protrudes inward in the radial direction is formed along the circumferential direction. The projection 333 can be formed by, for example, pressing the side wall portion 332C of the cap 330C to deform the side wall portion 332C in the step of crimping the side wall portion 332C to the relay ring portion 323 of the gasket 320 via the opening edge portion 110 during production process of the battery 30. Along with the deformation of the side wall portion 332C, a projection 111 that protrudes inward in the radial direction is formed along the circumferential direction at a position corresponding to the projection 333 of the inner circumferential surface of the cylinder portion 120. The projection 333 presses the opening edge portion 110 against the end face 311T, and at the same time, the projection 111 presses the relay ring portion 323 of the gasket 320 against the end face 311T.

A recessed portion 3231 may be formed in advance in the relay ring portion 323 of the gasket 320 at a position corresponding to the projection 333 in a non-compressed state. As a result of the recessed portion 3231 being formed in the gasket 320, excessive deformation of the gasket 320 when the relay ring portion 323 is compressed can be suppressed. However, in the present invention, the recessed portion 3231 is not a requirement. From the viewpoint of increasing the amount of compression of the gasket 320 when the relay ring portion 323 is compressed and enhancing sealing properties between the sealing member 300C and the cylinder portion 120, the recessed portion 3231 may be omitted, or the recessed portion 3231 may be formed to be shallow.

As the projection 333, a plurality of projections 333 may be formed intermittently along the circumferential direction of the opening, or a projection 333 that is continuous along the circumferential direction of the opening may be formed. The projection 333 formed continuously may press the relay ring portion 323 of the gasket 320 more strongly against the end face 311T of the circumferential edge portion 311 of the sealing plate 310 via the opening edge portion 110. Accordingly, sealing properties between the sealing plate 310 and the cylinder portion 120 are ensured more reliably. In the case where a plurality of projections 111 are formed intermittently, it is preferable to provide a plurality of (at least two, preferably four or more) projections 333 at angularly equidistant positions about the opening.

In the height direction of the battery can 100, the position of the projection 333 and the center position of the end face 311T are substantially the same. With this configuration, deformation of the sealing plate 310 and the gasket 320 is suppressed. Also, the pressure applied to the gasket 320 or the relay ring portion 323 of the gasket 320 is unlikely to be non-uniform. Accordingly, deformation of the gasket 320 is likely to be suppressed, the compression ratio of the gasket 320 can be increased, and sealing properties between the sealing plate 310 and the cylinder portion 120 can be more significantly ensured.

As used herein, the expression "the position of the projection 333 and the center position of the end face 311T of the sealing plate 310 are substantially the same" means that the amount of offset between the position of the projection 111 and the center position of the end face 111T of the sealing plate in the height direction of the battery can 100 is 4% or less of height H of the battery can 100.

A recessed groove 3111 is formed at the center position of the end face 311T of the circumferential edge portion 311 of the sealing plate 310 so as to correspond to the projection 333 of the side wall portion 332C. The amount of offset between the center position of the recessed groove 3111 and the position of the projection 333 may be 4% or less of the height H of the battery can 100.

The inner circumferential surface of the side wall portion 332C of the cap 330C overlaps the outer circumferential surface of the cylinder portion 120 and is in contact with the outer circumferential surface of the cylinder portion 120 on the opening edge portion 110 side of the cylinder portion 120. The inner diameter of the side wall portion 332C is less than or equal to the maximum value of the outer diameter of a portion of the housing portion 150 that does not overlap the inner circumferential surface of the side wall portion 332C. That is, a portion (the opening edge portion 110) of the cylinder portion 120 that overlaps the inner circumferential surface of the side wall portion 332C is recessed in the radial direction. With this configuration, the amount of extension of the outer diameter of the side wall portion 332C of the cap 330C relative to the outer diameter of the housing portion 150 can be suppressed. The outer diameter of the side wall portion 332C of the cap 330C may be set to be substantially equal to or less than the outer diameter of the housing portion 150 so as to minimize variations in the axial direction in the diameter of the battery.

In a no-load state, minimum inner diameter $D_{332}$ (excluding the region where the projection 333 is formed) of the side wall portion 332C may be smaller than maximum outer diameter $D_{110}$ of the portion (the opening edge portion 110) of the cylinder portion 120 that overlaps the inner circumferential surface of the side wall portion 332C. The battery can 100 with its opening being closed by the sealing plate 310 and the gasket 320 is press-fitted into the cap 330C, and the cap 330C can be thereby fixed to the battery can 100. From the viewpoint of fixing properties, the ratio of the inner diameter $D_{332}$ to the outer diameter $D_{110}$ may be 0.99 or less, or 0.98 or less. On the other hand, from the viewpoint of ease of press-fitting, the ratio of the inner diameter $D_{332}$ to the outer diameter Duo is preferably 0.9 or more.

In order to firmly connect the cap 330C and the battery can 100, the cap 330C may be welded to the cylinder portion 120. Preferably, the side wall portion 332C may be welded to the cylinder portion 120 in at least a portion of a region where the inner circumferential surface of the side wall portion 332C and the outer circumferential surface of the cylinder portion 120 on the opening edge portion side overlap with each other.

Figure 20:
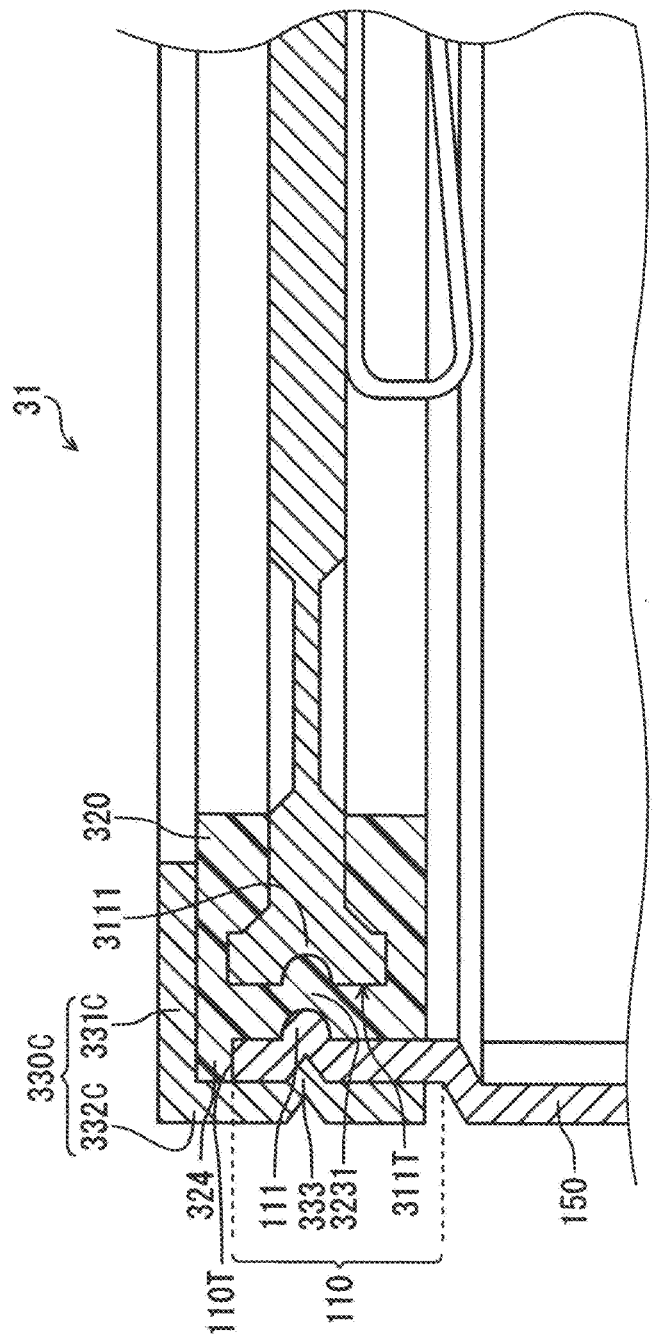
FIG. 20 is a schematic vertical cross sectional view of a relevant part, showing another aspect of the battery shown in FIG. 17.

FIG. 20 shows another aspect of the battery 30. FIG. 20 is an enlarged schematic vertical cross sectional view of the vicinity of an opening edge portion 110 in a battery 31 according to the third aspect of the present disclosure. The battery 31 is different from the battery 30 in that a space between the opening edge portion 110 and an inner surface of a top plate portion 331C is filled with a gasket 320. Other structural elements are the same as those of the battery 30.

The gasket 320 includes, on an upper portion of the relay ring portion 323, an engagement portion 324 that protrudes from the relay ring portion 323 toward the outer circumferential side. The opening edge portion 110 opposes the top plate portion 331C via the engagement portion 324. The engagement portion 324 functions to position the gasket 320 to the opening edge portion 110. Also, the engagement portion 324 is compressed in the axial direction in the step of sealing the battery, and thus sealing properties between the sealing member 300C and the cylinder portion 120 can be enhanced.

Eighth Embodiment

Figure 21:
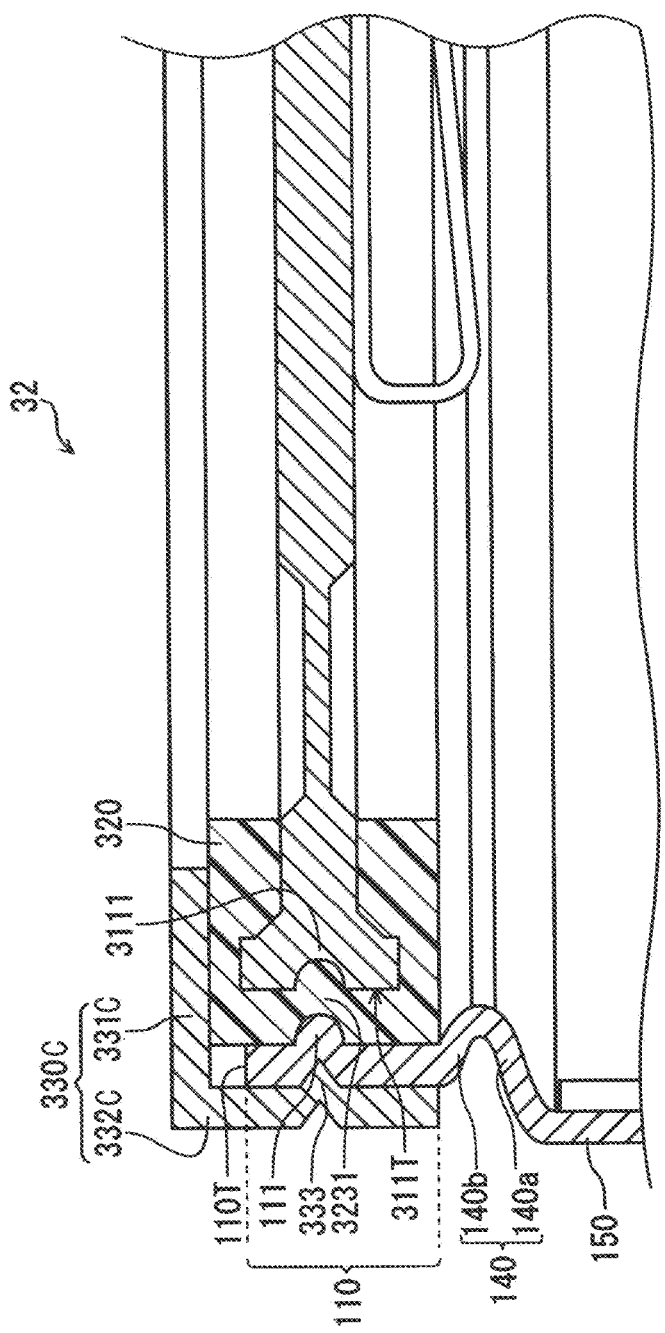
FIG. 21 is an enlarged schematic vertical cross sectional view of a relevant part, showing an embodiment of the battery according to the third aspect of the present disclosure.

FIG. 21 shows an embodiment of the battery according to the third aspect of the present disclosure, and is an enlarged schematic vertical cross sectional view of the vicinity of an opening edge portion 110. As with the battery 30, a battery 32 shown in FIG. 21 is a cylindrical battery, and includes a bottomed cylindrical battery can 100, a cylindrical electrode body 200 that is housed in the can, and a sealing member 300C that seals an opening of the battery can 100.

In the battery 32, a bent portion (radially recessed portion) 140 is formed between a housing portion 150 and the opening edge portion 110 of the battery can 100, the bent portion 140 being a portion that has an inner diameter smaller than the inner diameter of a non-housing portion and the inner diameter of the housing portion 150, and protrudes toward an inner circumferential surface of a cylinder portion 120. In other words, the opening edge portion 110 is continuous with the housing portion 150 via the bent portion 140. The bent portion 140 includes: a first bent portion 140a whose inner diameter decreases continuously from the housing portion 150; and a second bent portion 140b whose inner diameter decreases continuously from the opening edge portion 110 and that is continuous with the first bent portion 140a at a position where the inner diameter is smallest. One end portion of the opening edge portion 110 is continuous with the second bent portion 140b, and the other end portion of the opening edge portion 110 forms an opening edge.

The bent portion 140 functions to support the gasket 320 on the electrode body side and fix the positions of the sealing plate 310 and the gasket 320 when the opening of the battery can 100 is closed by the sealing plate 310 and the gasket 320 in the step of sealing the battery 32. Also, although depending on the degree of protrusion of the bent portion 140 toward the inner circumferential surface side, as a result of the inner ring portion 322 being compressed in the upward direction via the second bent portion 140b and the outer ring portion 321 being compressed in the downward direction via the top plate portion 331C, the space between the sealing plate 310 and the cylinder portion 120 can be tight sealed by using the repulsive force of the gasket.

Other structural elements of the battery 32 are the same as those of the battery 30.

[Fourth Aspect]

A battery according to a fourth aspect of the present disclosure includes: a battery can that includes a cylinder portion that includes an opening edge at one end portion of the cylinder portion and a bottom portion that closes the other the end portion of the cylinder portion; an electrode body that is housed in the cylinder portion; and a sealing member that is fixed to the opening edge to seal an opening of the opening edge. The sealing member includes a sealing plate, a cap that extends outward from an outer circumferential edge of the sealing plate and is connected to the sealing plate while being electrically insulated from the sealing plate, and a gasket that seals a space between the opening edge and the cap. The cap includes a ring-shaped top plate portion that opposes the opening edge in an axial direction of the cylinder portion, and a cylindrical side wall portion that extends from an outer circumferential edge of the top plate portion toward the bottom portion, and covers an outer circumferential surface of the cylinder portion on the opening edge side. The gasket is provided between the opening edge and the top plate portion, and the opening edge is pressed in the axial direction by the gasket.

Ninth Embodiment

Figure 22:
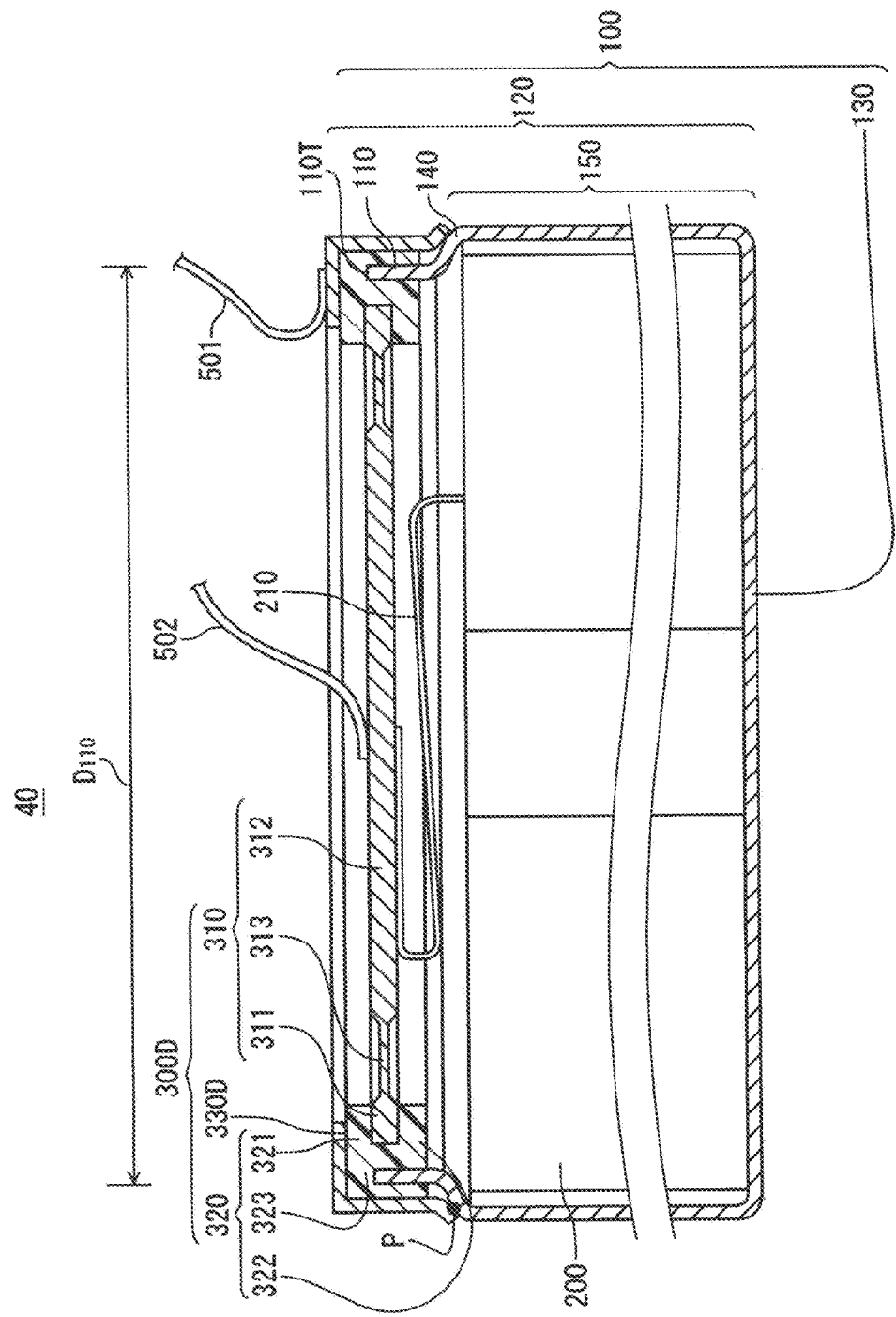
FIG. 22 is a schematic vertical cross sectional view showing an embodiment of a battery according to a fourth aspect of the present disclosure.
Figure 23:
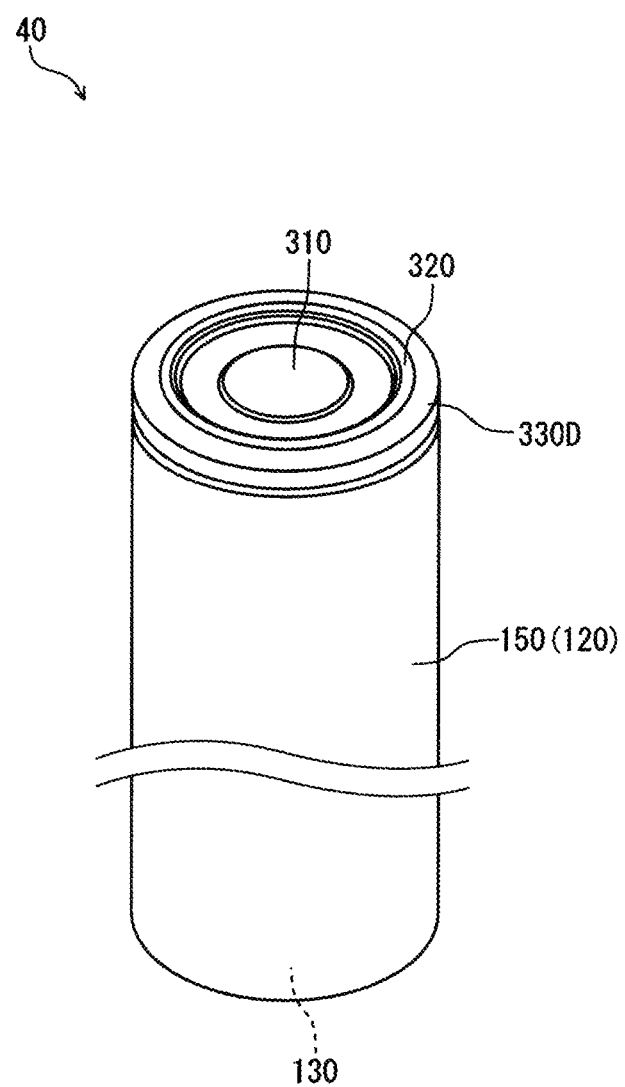
FIG. 23 is a perspective view showing an outer appearance of the battery.
Figure 24:
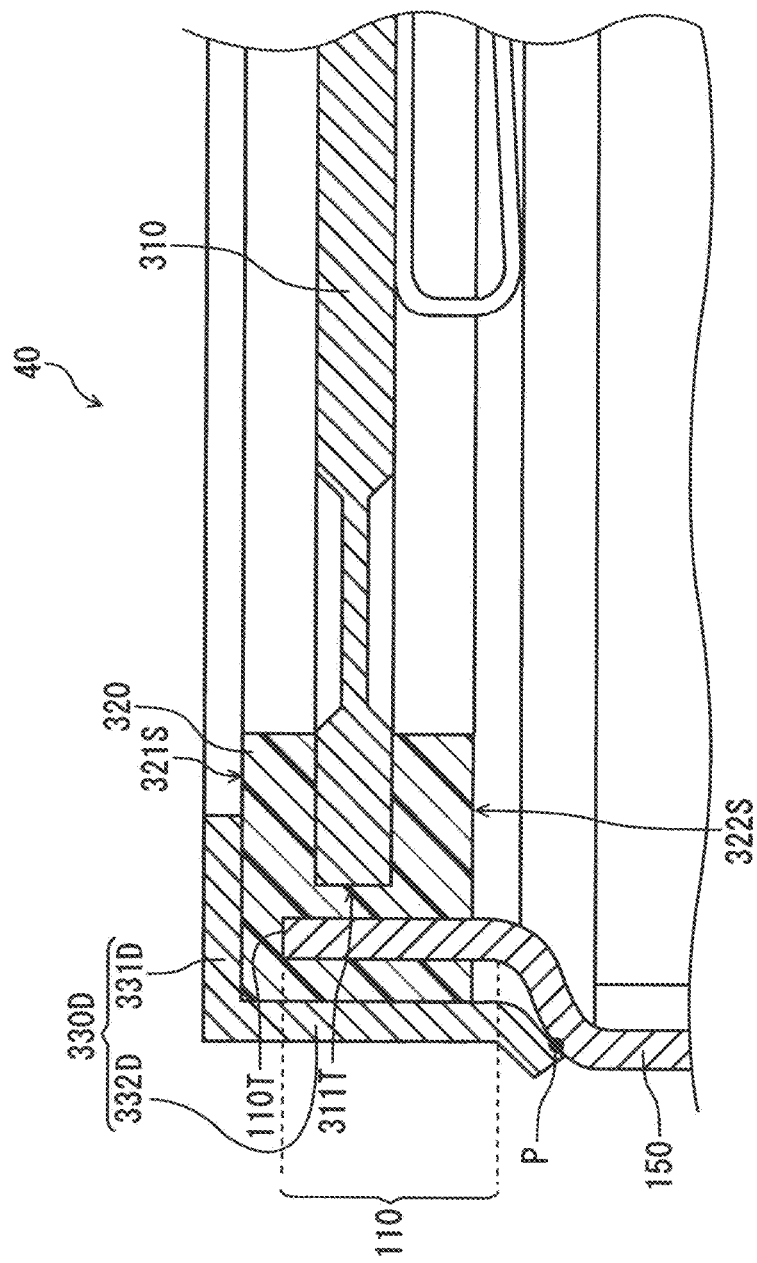
FIG. 24 is an enlarged schematic vertical cross sectional view of a relevant part of the battery shown in FIG. 22.

FIG. 22 is a schematic vertical cross sectional view showing an embodiment of the battery according to the fourth aspect of the present disclosure, and FIG. 23 is a perspective view of the battery. FIG. 24 is an enlarged schematic vertical cross sectional view of the vicinity of an opening edge portion 110 in a battery 40 shown in FIG. 22. The battery 40 is a cylindrical battery, and includes a bottomed cylindrical battery can 100, a cylindrical electrode body 200 that is housed in the can, and a sealing member 300D that seals an opening of the battery can 100.

The battery can 100 includes a cylinder portion 120 that houses the electrode body 200 and a bottom portion 130. The cylinder portion 120 includes an opening edge at one of end portions of the cylinder portion 120, and the other end portion is closed by the bottom portion 130. The cylinder portion 120 includes a housing portion 150 that houses the electrode body and a non-housing portion that is provided on the opening edge side relative to the housing portion 150, and in which the electrode body is not housed. At least a portion of the non-housing portion constitutes the opening edge portion 110. The opening edge is closed by the sealing member 300D.

The sealing member 300D includes a sealing plate 310, a gasket 320 (fifth gasket) provided on a circumferential edge portion 311 of the sealing plate 310, and a cap 330D. Other structural elements of the sealing plate 310 are the same as those of the battery 10 of the first aspect.

The gasket 320 includes an outer ring portion 321, an inner ring portion 322, and a relay ring portion 323 that connects the outer ring portion 321 and the inner ring portion 322, and seals a space between the opening edge portion 110 and the sealing plate 310. An end face 311T of the circumferential edge portion 311 of the sealing plate 310 is covered with the relay ring portion 323.

The outer ring portion 321, the inner ring portion 322, and the relay ring portion 323 are formed as an integrally molded body. The gasket 320 may be integrally molded with the sealing plate 310 by means of, for example, insert molding. By performing integral molding, a state in which the sealing plate 310 and the gasket 320 closely adhere to each other can be easily achieved. Also, as a result of the sealing plate 310 and the gasket 320 being integrally molded, the sealing plate 310 and the gasket 320 can be handled as one component, and thus the production of the battery 40 can be facilitated.

The cap 330D includes a ring-shaped top plate portion 331D and a cylindrical side wall portion 332D. The cap 330D is electrically insulated from the sealing plate 310 by the gasket 320. The side wall portion 332D extends from an outer circumferential edge of the top plate portion 331D toward the bottom portion 130, and covers an outer circumferential surface of the opening edge portion 110 of the cylinder portion 120.

The cap 330D is electrically conductive, and has the same polarity as that of the battery can 100. Accordingly, the cap 330D can function as the other terminal that has a polarity different from that of the sealing plate 310. For this reason, electric current generated in both electrodes of the battery 40 can be collected from an upper surface of the sealing member 300D. For example, a configuration is possible in which a first external lead wire 501 is connected to the top plate portion 331D of the cap 330D, and a second external lead wire 502 is connected to an outer surface of a center region 312 of the sealing plate 310.

The opening edge portion 110 has an open end, and is continuous with the housing portion 150 via a bent portion (radially recessed portion) 140. An end portion 110T of the opening edge portion 110 is covered with the gasket 320.

The opening edge portion 110 is recessed in the radial direction relative to the housing portion 150. When the cap 330D in which the sealing plate 310 and the gasket 320 are fitted is placed on the cylinder portion 120, the end portion 110T of the opening edge portion 110 overlaps the inner ring portion 322 of the gasket 320. In this state, the cylinder portion 120 is pressed against the cap 330D in the axial direction. Then, a portion including the end portion 110T of the opening edge portion 110 passes through the gasket 320 and is fitted into the cap 330D. The gasket 320 is compressed in the axial direction above the end portion 110T. As a result, the gasket 320 is provided between the end portion 110T and the top plate portion 331D in a compressed state. Due to the repulsive force of the gasket, sealing properties between the opening edge portion 110 and the top plate portion 331D are ensured. The gasket 320 is also provided between the circumferential edge portion 311 of the sealing plate 310 and the top plate portion 331D, and seals a space between the sealing plate 310 and the cap 330D.

In order for the opening edge portion 110 to be easily fitted into the gasket 320 by pressing and for the end portion 110T of the opening edge portion 110 to be easily positioned to the gasket 320 when pressing, a recessed portion may be formed in the inner ring portion 322 of the gasket 320 at a position that overlaps the end portion 110T in a non-compressed state.

The inner circumferential surface of the side wall portion 332D is bonded to the outer circumferential surface of the cylinder portion 120 by welding at a bonding position P. By doing so, the sealing member 300D is fixed to the cylinder portion 120, and electrical connection between the cap 330D and the cylinder portion 120 is achieved.

The inner circumferential surface of the side wall portion 332D of the cap 330D overlaps the outer circumferential surface of the cylinder portion 120 on the opening edge portion 110 side. The inner diameter of the side wall portion 332D is less than or equal to the maximum value of the outer diameter of a portion (the housing portion 150) of the cylinder portion 120 that does not overlap the inner circumferential surface of the side wall portion 332D. That is, a portion (the opening edge portion 110) of the cylinder portion 120 that overlaps the inner circumferential surface of the side wall portion 332D is recessed in the radial direction. With this configuration, the amount of extension of the outer diameter of the side wall portion 332D of the cap 330D relative to the outer diameter of the housing portion 150 can be suppressed. The outer diameter of the side wall portion 332D of the cap 330D may be set to be substantially equal to or less than the outer diameter of the housing portion 150 so as to minimize variations in the axial direction in the diameter of the battery. In the present embodiment, the opening edge portion 110 is recessed in the radial direction, but the reduction in the placement space for the electrode body caused as a result of the opening edge portion 110 being recessed in the radial direction is suppressed, as compared with the conventional configuration in which the radially recessed portion is formed by forming a groove. Accordingly, a battery with a high energy density can be achieved.

In the example shown in FIG. 22, a non-housing portion that is recessed in the radial direction is formed by bending the cylinder portion 120 from the housing portion 150 into a crank shape at a position below the gasket 320 (on the electrode body side). A bent portion 140 can be provided in proximity to an opposing surface (an outer surface 322S of the inner ring portion 322) of the gasket 320 that opposes the electrode body. Furthermore, the non-housing portion that is recessed in the radial direction may be formed by bending the cylinder portion 120 at a position above the outer surface 322S of the inner ring portion 322. In this case, a portion of the gasket 320 between the side wall portion 332D and the opening edge portion 110 is formed to have a small thickness in the axial direction of the cylinder portion, and the length of the non-housing portion (the opening edge portion 110 and the bent portion 140) in the axial direction is shortened. In this case, the bent portion 140 can be positioned within the gasket 320 in the axial direction of the cylinder portion. In other words, the bent portion 140 can be positioned between the outer surface 322S of the inner ring portion and the outer surface 321S of the outer ring portion in the axial direction of the cylinder portion. In this case, despite the fact that the non-housing portion is recessed in the radial direction, the placement space for the electrode body is not restricted.

In a no-load state, minimum inner diameter $D_{332}$ of the side wall portion 332D may be smaller than maximum outer diameter $D_{110}$ of the portion (the opening edge portion 110) of the cylinder portion 120 that overlaps the inner circumferential surface of the side wall portion 332. The battery can 100 with its opening being closed by the sealing plate 310 and the gasket 320 is press-fitted into the cap 330D, and the cap 330D can be thereby fixed to the battery can 100. From the viewpoint of fixing properties, the ratio of the inner diameter $D_{332}$ to the outer diameter $D_{110}$ may be 0.99 or less, or 0.98 or less. On the other hand, from the viewpoint of ease of press-fitting, the ratio of the inner diameter $D_{332}$ to the outer diameter $D_{110}$ is preferably 0.9 or more.

Tenth Embodiment

Figure 25:
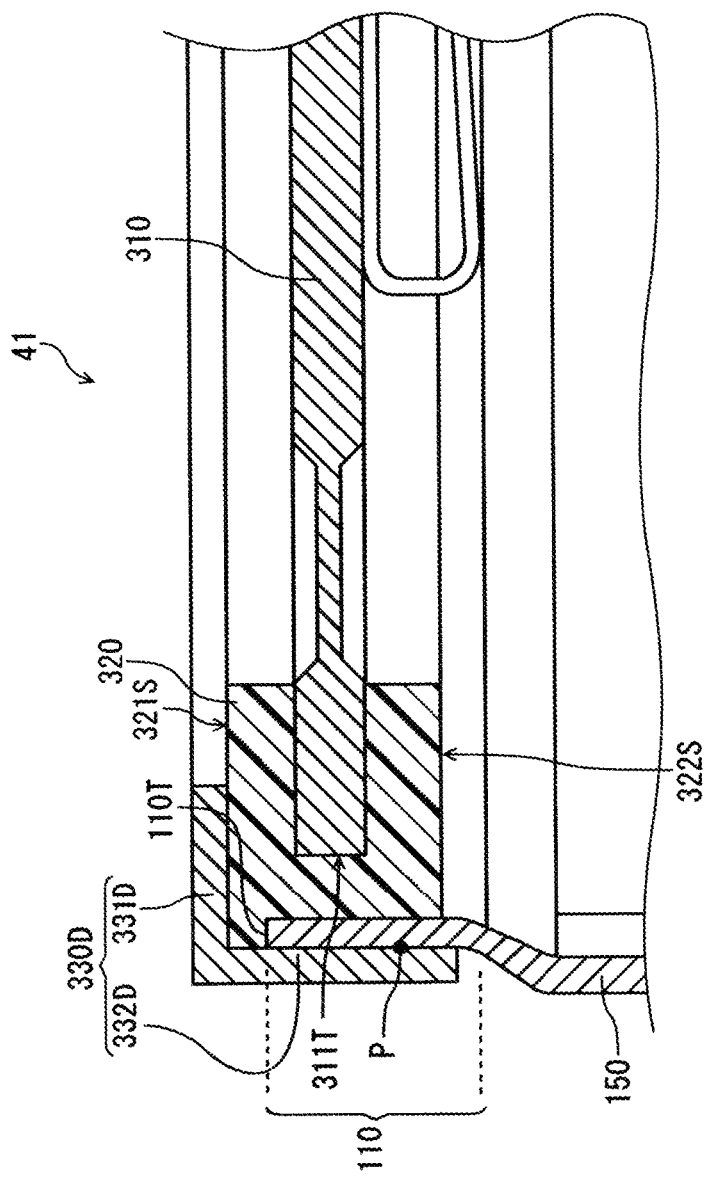
FIG. 25 is an enlarged schematic vertical cross sectional view of a relevant part, showing an embodiment of the battery according to the fourth aspect of the present disclosure.

FIG. 25 shows an embodiment of the battery according to the fourth aspect of the present disclosure, and is an enlarged schematic vertical cross sectional view of the vicinity of an opening edge portion 110. As with the battery 40, a battery 41 shown in FIG. 25 is a cylindrical battery, and includes a bottomed cylindrical battery can 100, a cylindrical electrode body 200 that is housed in the can, and a sealing member 300D that seals an opening of the battery can 100.

In the battery 41, an inner circumferential surface of the opening edge portion 110 and an end face of an end portion 110T are covered with a gasket 320 (fifth gasket). On the other hand, an outer circumferential surface of the opening edge portion 110 is in contact with a side wall portion 332D of a cap 330D. With this configuration, the opening edge portion 110 and the side wall portion 332D are electrically connected to each other, and as a result of the contact area being increased, resistance is reduced.

As with the battery 40, a non-housing portion is recessed in the radial direction, and the inner diameter of the side wall portion 332D is less than or equal to the maximum value of the outer diameter of a housing portion 150 of a cylinder portion 120. However, the battery 41 is configured such that the outer circumferential surface of the opening edge portion 110 is in contact with the side wall portion 332D, and thus the degree of recess in the radial direction is smaller than that of the battery 40. Accordingly, the processing of recessing the opening edge portion 110 in the radial direction can be easily performed. Also, it is easy to set the position where the cylinder portion 120 is bent from the housing portion 150 to be in proximity to an outer surface 322S of the gasket 320 that opposes the electrode body in the axial direction of the cylinder portion, or within the gasket 320.

As with the battery 40, the gasket 320 is provided between the end portion 110T of the opening edge portion and the top plate portion of 331D in a compressed state. With the gasket 320 being compressed, the opening edge portion 110 is inserted into the cap 330D, the opening edge portion 110 and the side wall portion 332D are bonded, and the cap 330D is fixed to the battery can 100. The opening edge portion 110 and the side wall portion 332D are preferably bonded by welding. By performing welding, the cap can be more firmly fixed to the battery can. The bonding position P may be anywhere in a region where the outer circumferential surface of the cylinder portion 120 and the inner circumferential surface of the side wall portion 332D overlap each other and are in contact with each other.

Other structural elements of the battery 41 are the same as those of the battery 40.

Eleventh Embodiment

Figure 26:
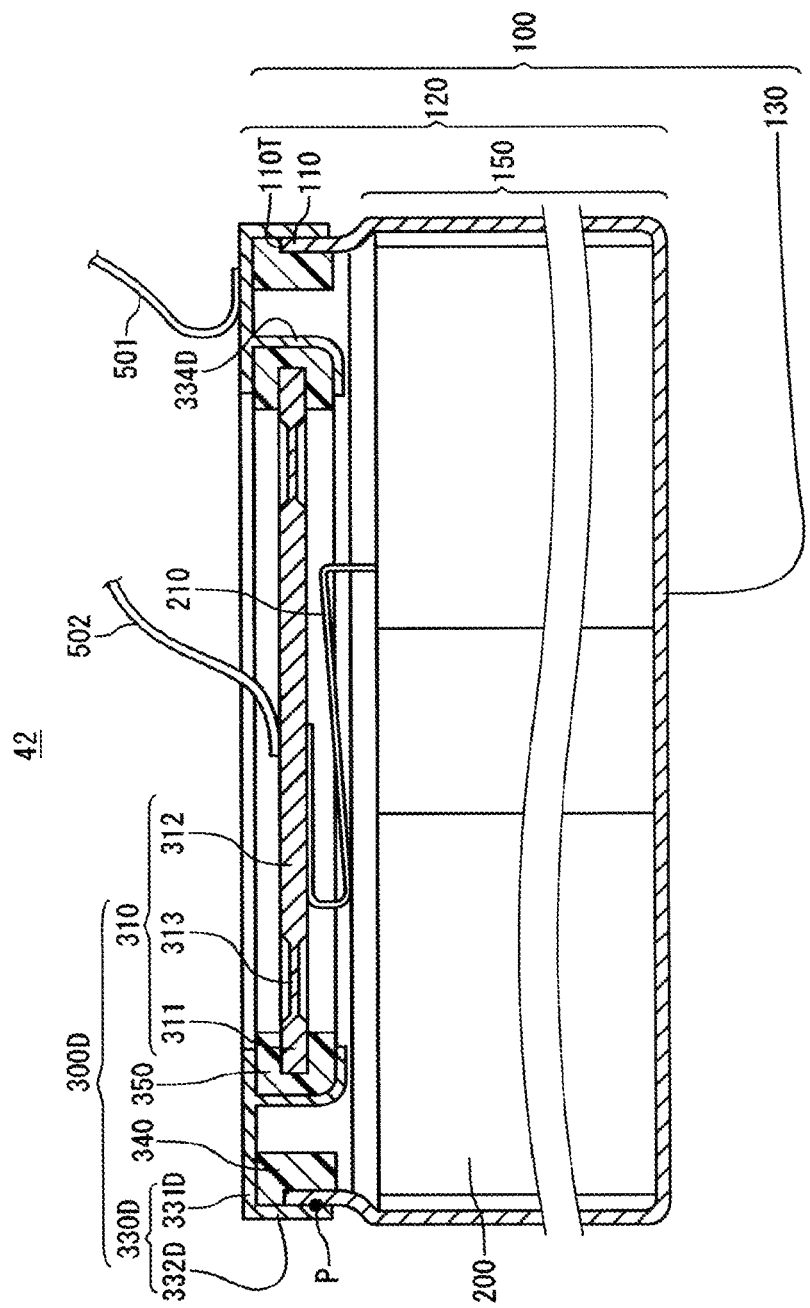
FIG. 26 is a schematic vertical cross sectional view showing an embodiment of the battery according to the fourth aspect of the present disclosure.

FIG. 26 is a schematic vertical cross sectional view showing an embodiment of the battery according to the fourth aspect of the present disclosure. A battery 42 shown in FIG. 26 is configured such that the function of the gasket 320 that seals the space between the opening edge portion and the sealing plate in the battery 41 is implemented by using two gaskets that are spaced apart from each other. In the battery 42, a sealing member 300D includes a gasket 340 (fifth gasket) and a gasket 350 (sixth gasket).

The gasket 340 seals a space between a cap 330D and an opening edge portion 110. The gasket 340 covers an inner circumferential surface of the opening edge portion 110 and an end face of an end portion 110T, and is provided between the end portion 110T and the top plate portion 331D in a compressed state. The outer diameter of the gasket 340 may be larger than the inner diameter of a side wall portion 332D in a no-load state. In this case, by press-fitting, the gasket 340 can be brought into close contact with the cap 330D.

The gasket 350 corresponds to the gasket 320 of the battery 41 shown in FIG. 25, and seals a space between the cap 330D and the sealing plate 310. As with the gasket 320 shown in FIG. 25, the gasket 350 includes an outer ring portion that covers an upper surface of the circumferential edge portion 311 of the sealing plate 310, an inner ring portion that covers a lower surface of the circumferential edge portion 311 of the sealing plate 310, and a relay ring portion that connects the outer ring portion and the inner ring portion. The sealing plate 310 and the gasket 350 may be formed as, for example, an integrally molded body. The gasket 350 may be integrally molded with the sealing plate 310 by means of, for example, insert molding.

The cap 330D includes a supporting portion 334D. In the top plate portion 331D, the supporting portion 334D extends to stand vertically from a position on the inner circumferential side than the position of the side wall portion 332D toward the bottom portion 130 in the axial direction. With the supporting portion 334D, the gasket 350 is fixed to the cap 330D while sealing the space between the cap 330D and the sealing plate 310. When the supporting portion 334D that extends to stand vertically from the top plate portion 331D is viewed from the axial direction, the contour line of the supporting portion 334D conforms to the shape of the gasket 350. For example, in the case where the battery is a cylindrical battery, and the shape of the gasket 350 when viewed from the axial direction is circular, the contour line of the supporting portion 334D is also circular. However, the contour line does not necessarily need to be a closed curve, and a partial region where the supporting portion 334D is not provided may be included in the circumferential direction.

The outer diameter of the gasket 350 may be larger than the inner diameter of the supporting portion 334D in a no-load state. In this case, by press-fitting, a relay ring portion of the gasket 350 comes into close contact with the supporting portion 334, and thus a space between the cap 330D and the sealing plate 310 can be sealed.

In the example shown in FIG. 26, the supporting portion 334D extends toward the bottom portion 130 in the axial direction, and is bent along the circumferential edge of the gasket 350 to extend inward toward a center region 312 of the sealing plate 310. By doing so, sealing properties between the cap 330D and the sealing plate 310 can be further enhanced. A bent portion of the supporting portion 334D can be formed by crimping and bending a portion of the vertically extending supporting portion 334D toward the inner circumferential side. The bent portion does not necessarily need to be formed around the entire circumference of the supporting portion 334D, and may be formed intermittently along the circumferential direction.

Other structural elements of the battery 42 are the same as those of the battery 41.

In the battery 42, as the method for sealing the space between the cap 330D and the opening edge portion 110 using the gasket 340, the same method as that used in the battery 40 may be used.

Twelfth Embodiment

Figure 27:
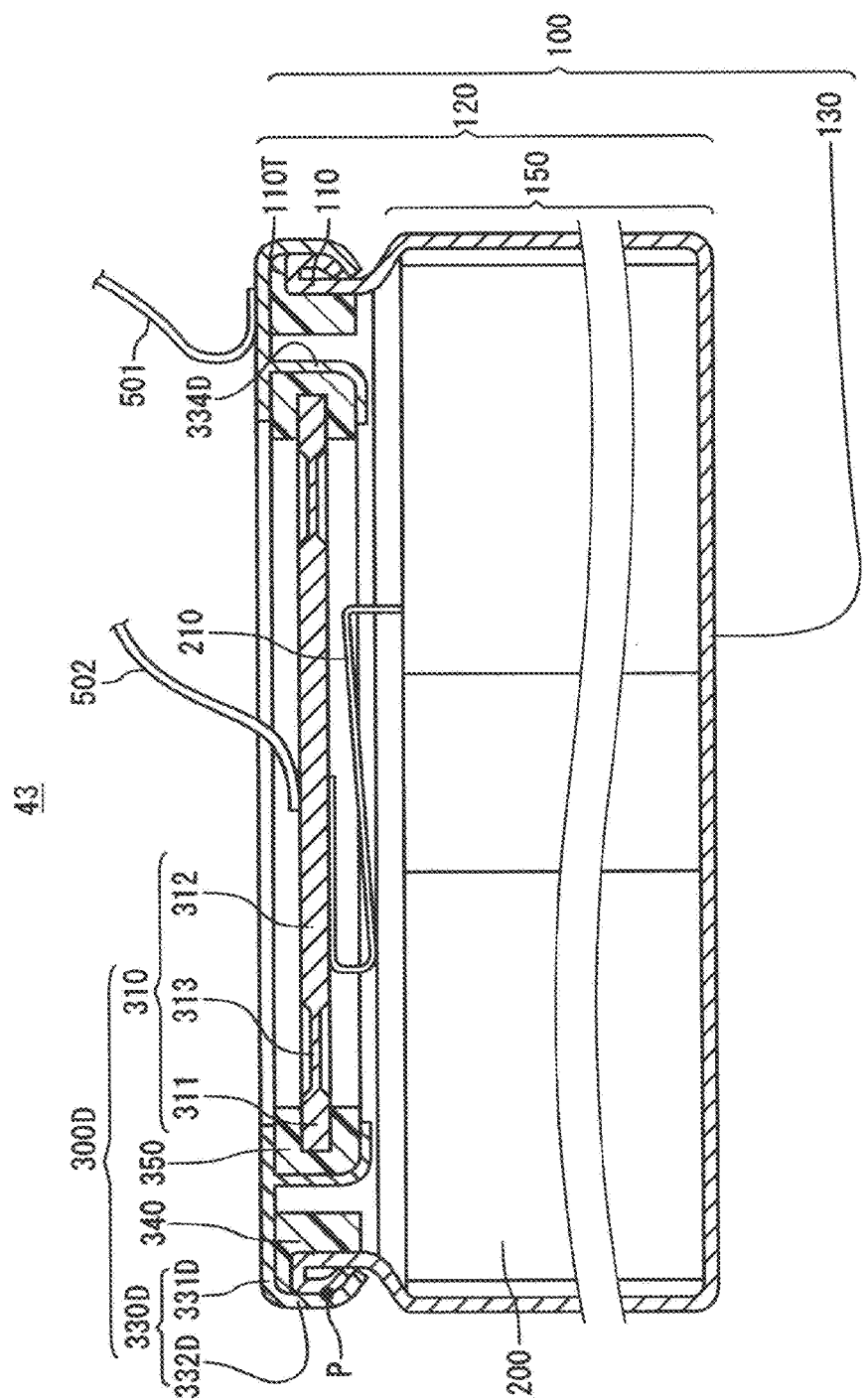
FIG. 27 is a schematic vertical cross sectional view showing an embodiment of the battery according to the fourth aspect of the present disclosure.

FIG. 27 is a schematic vertical cross sectional view showing an embodiment of the battery according to the fourth aspect of the present disclosure. In a battery 43 shown in FIG. 27, an end portion of a cylinder portion 120 of a battery can 100 on the opening edge side is formed in a U shape by extending in a direction toward a top plate portion 331D and then extending toward a bottom portion 130. In other words, the end portion on the opening edge side is shaped to be bent or curved outward in the radial direction of the cylinder portion 120 and extend toward the bottom portion 130 in the non-housing portion. A gasket 340 (fifth gasket) is provided between the top plate portion 331D of a cap 330D and a portion extending toward the bottom portion 130 from the bent position or the curved position, and presses the end portion 110T of the opening edge portion 110. The gasket 340 may also be provided between the portion extending toward the bottom portion 130 and the side wall portion 332D of the cap 330D. In the battery 43, a portion of the U-shaped bent or curved portion of the cylinder portion 120 that opposes the top plate portion 331D is defined as the end portion 110T of the opening edge portion.

The sealing structure for the opening edge portion 110 of the battery 43 described above can be produced by, for example, using the following method.

(i) An intermediate sealing member in which the sealing plate 310 and the gasket 350 are attached and the space between the cap 330D and the sealing plate 310 is sealed is prepared. However, in the intermediate sealing member, the side wall portion of the cap 330D is not formed, or the angle between the side wall portion and the top plate portion is obtuse.

(ii) The non-housing portion (the opening edge portion 110) of the cylinder portion 120 is recessed in the radial direction, and the end portion of the cylinder portion 120 recessed in the radial direction is bent substantially parallel to the bottom portion 130 so as to form a surface substantially parallel to the bottom portion 130.

(iii) The gasket 340 is placed on the opening edge portion 110 such that at least a portion of the gasket 340 overlaps the formed surface substantially parallel to the bottom portion 130. Furthermore, the intermediate sealing member is placed on the gasket 340 such that the gasket 340 is provided between the top plate portion 331D and the opening edge portion 110.

(iv) The outer circumferential edge portion or the side wall portion of the cap 330D is crimped in a direction toward the bottom portion 130 together with the opening edge portion while pressing the opening edge portion 110 in the axial direction.

When bonding the non-housing portion (the opening edge portion 110) of the cylinder portion 120 and the side wall portion 332D, the bonding position P may be set at a position on the bottom portion 130 side relative to a region where the first gasket 340 is provided in the portion that is bent or curved outward in the radial direction and extends toward the bottom portion 130.

In a configuration in which the gasket 340 and the gasket 350 are not separate such as, for example, the battery 40, the same sealing method as that used in the battery 43 may be used.

In each of the batteries according to the aspects described above, the material of the battery can 100 is not particularly limited. Examples of the material of the battery can 100 include iron and/or iron alloys (including stainless steel), copper, aluminum, aluminum alloys (alloys that contain a trace amount of metals such as manganese and copper, etc.), and the like. The material of the caps 330A, 330B, 330C, and 330D is not particularly limited either, and the same materials as those listed for the battery can 100 can be used.

The material of the gaskets 320, 340, and 350 is not particularly limited. For example, materials that can be easily integrally molded such as polypropylene (PP), polyphenylene sulfide (PPS), polyethylene (PE), polybutylene terphthalate (PBT), perfluoroalkoxy alkane (PFA), polytetrafluoroethylene (PTFE), and polyamide (PA) can be used.

Next, an exemplary description of the configuration of the electrode body 200 will be given by taking a lithium ion secondary battery as an example.

The cylindrical electrode body 200 is a wound electrode body configured by spirally winding a positive electrode and a negative electrode with a separator interposed therebetween. An inner lead wire 210 is connected to one of the positive electrode and the negative electrode. The inner lead wire 210 is connected to the inner surface of the center region 312 of the sealing plate 310 by welding or the like. Another lead wire is connected to the other one of the positive electrode and the negative electrode, and the other lead wire is connected to the inner surface of the battery can 100 by welding or the like. Also, another insulating plate (lower insulating plate) may be provided between the electrode body 200 and the bottom portion 130. In this case, the other lead wire may be connected to the inner surface of the battery can 100 by passing through a through hole formed in the other insulating plate or bypassing the other insulating plate.

(Negative Electrode)

The negative electrode includes a strip-shaped negative electrode current collector and a negative electrode active material layer formed on each surface of the negative electrode current collector. As the negative electrode current collector, a metal film, a metal foil, or the like is used. The material of the negative electrode current collector is preferably at least one selected from the group consisting of copper, nickel, titanium, alloys thereof, and stainless steel. The thickness of the negative electrode current collector is preferably, for example, 5 to 30 μm.

The negative electrode active material layer contains a negative electrode active material, and optionally a binding agent and a conductive material. The negative electrode active material layer may be a deposition film formed by a vapor phase method (for example, deposition). Examples of the negative electrode active material include Li metal, metals or alloys that electrochemically react with Li, carbon material (for example, graphite), silicon alloys, silicon oxides, metal oxides (for example, lithium titanate), and the like. The thickness of the negative electrode active material layer is preferably, for example, 1 to 300

(Positive Electrode)

The positive electrode includes a strip-shaped positive electrode current collector and a positive electrode active material layer formed on each surface of the positive electrode current collector. As the positive electrode current collector, a metal film, a metal foil (a stainless steel foil, an aluminum foil, or an aluminum alloy foil), or the like is used.

The positive electrode active material layer contains a positive electrode active material and a binding agent, and optionally a conductive material. The positive electrode active material is not particularly limited, but a lithium-containing composite oxide such as $LiCoO_2$ or $LiNiO_2$ can be used. The thickness of the positive electrode active material layer is preferably, for example, 1 to 300 μm.

As the conductive material contained in each active material layer, graphite, carbon black or the like is used. The amount of the conductive material is, for example, 0 to 20 parts by mass per 100 parts by mass of the active material. As the binding agent contained in the active material layer, fluorocarbon resin, acrylic resin, rubber particles or the like may be used. The amount of the binding agent is, for example, 0.5 to 15 parts by mass per 100 parts by mass of the active material.

(Separator)

As the separator, a microporous resin film or a non-woven fabric is preferably used. Preferred examples of the material (resin) of the separator include polyolefin, polyamide, polyamide imide, and the like. The thickness of the separator may be, for example, 8 to 30 μm.

(Electrolyte)

As the electrolyte, a non-aqueous solvent in which a lithium salt is dissolved may be used. Examples of the lithium salt include $LiClO_4$, $LiBF_4$, $LiPF_6$, $LiCF_3SO_3$, $LiCF_3CO_2$, imide salts, and the like. Examples of the non-aqueous solvent include: cyclic carbonic esters such as propylene carbonate, ethylene carbonate, and butylene carbonate; linear carbonic esters such as diethyl carbonate, ethyl methyl carbonate, and dimethyl carbonate; cyclic carboxylic acid esters such as γ-butyrolactone and γ-valerolactone; and the like.

The foregoing description has been given by taking a lithium ion secondary battery as an example. However, the present invention is applicable to a battery in which the battery can is sealed by using a sealing body, irrespective of whether the battery is a primary battery or a secondary battery.

INDUSTRIAL APPLICABILITY

The battery according to the present invention is applicable to various can-type batteries, and is suitable for use as a power source for, for example, a portable device, a hybrid vehicle, an electric vehicle, or the like.

The present invention has been described in terms of the presently preferred embodiments, but the disclosure should not be interpreted as limiting. Various alterations and modifications will no doubt become apparent to those skilled in the art to which the invention pertains, after having read the disclosure. Accordingly, it is to be understood that the appended claims be interpreted as covering all alterations and modifications which fall within the true spirit and scope of the present invention.

REFERENCE SIGNS LIST 10 to 17, 20, 30 to 32, 40 to 43: battery
100: battery can
110c: opening 120: cylinder portion
    110: opening edge portion
        110T: end portion
        111: projection
    140: bent portion (radially recessed portion)
    150: housing portion
    160: step portion
    130: bottom portion
200: electrode body
    210: inner lead wire
    220: upper insulating plate
300A, 300B, 300C, 300D: sealing member
    310: sealing plate
        311: circumferential edge portion
            311a: inner circumferential edge portion
            311b: outer circumferential edge portion
            311T: end face
            311I: recessed groove
        312: center region
        313: thin portion
    320: gasket (third, fourth, or fifth gasket)
        321: outer ring portion
        322: inner ring portion
        323: relay ring portion
            3231: recessed portion
        324: engagement portion
    330A, 330B, 330C, 330D: cap
        331A, 331B, 331C, 331D: top plate portion
        332A, 332B, 332C, 332D: side wall portion
            333: projection
            338: end portion
        334A, 334B, 334D: supporting portion
        335A: supporting wall
        336: through hole
    340: gasket (first or fifth gasket)
    350: gasket (second or sixth gasket)
401: first engagement portion
402: second engagement portion
405: sealing agent
501: first external lead wire
502: second external lead wire

The invention claimed is:

1. A battery comprising:
a battery can that includes a cylinder portion and a bottom portion, the cylinder portion having an opening edge portion at one of end portions of the cylinder portion, the other one of the end portions of the cylinder portion being closed by the bottom portion;
an electrode body that is housed in the cylinder portion; and
a sealing member that is fixed to the cylinder portion to seal an opening of the opening edge portion,
wherein the sealing member includes: a sealing plate; a cap that has a through hole corresponding to the sealing plate and is connected to the sealing plate while being electrically insulated from the sealing plate; and a sealing portion that seals a space between the cylinder portion and the cap,
with a direction in which the two end portions of the cylinder portion face each other being defined as an axial direction,
the cap includes: a ring-shaped top plate portion that is disposed to oppose the opening edge portion in the axial direction and lies along a circumferential edge of the sealing plate; and a side wall portion that extends from a circumferential edge of the top plate portion toward the bottom portion and covers an outer circumferential surface of the cylinder portion,
the battery can is electrically connected to one of electrodes included in the electrode body,
the sealing plate is electrically connected to the other one of the electrodes included in the electrode body,
the cap is electrically connected to the cylinder portion,
the sealing portion includes a first gasket that seals a space between the opening edge portion and the cap,
the first gasket is provided between the opening edge portion and the top plate portion, is in contact with the top plate portion, and covers an inner circumferential surface of the cylinder portion at the opening edge portion,
the opening edge portion is pressed in the axial direction by the first gasket,
the sealing member further includes a second gasket that seals a space between the sealing plate and the cap,
the second gasket is provided spaced apart from a fifth gasket,
the cap includes a supporting portion that extends to stand from the top plate portion toward the bottom portion in the axial direction on an inner circumferential side of the top plate portion relative to a position of the side wall portion,
the second gasket is provided between an inner circumferential surface of the supporting portion and at least an outer circumferential edge portion of the sealing plate, and
the first gasket is provided in an outer circumferential region that is located on an outer circumferential side of the supporting portion and includes an outer circumferential end portion of the top plate portion.

2. The battery in accordance with claim 1,
wherein the first gasket is also provided between the outer circumferential edge portion of the sealing plate and the top plate portion to seal a space between the sealing plate and the cap.

3. The battery in accordance with claim 1,
wherein an end portion of the cylinder portion on a side of the opening edge portion has a shape that is bent or curved outward in a radial direction of the cylinder portion and then extends toward the bottom portion, and
the first gasket is provided between the top plate portion and a portion of the shape that extends from a bent or curved position toward the bottom portion.

4. The battery in accordance with claim 3,
wherein, in the shape, an outer circumferential surface of the cylinder portion and an inner circumferential surface of the side wall portion are bonded to each other on a side toward the bottom portion relative to a region where the first gasket is provided.

5. The battery in accordance with claim 1,
wherein the inner circumferential surface of the side wall portion is overlapped with the outer circumferential surface of the cylinder portion on the side of the opening edge portion,
an outer diameter of an overlapping region of the cylinder portion that is overlapped with the inner circumferential surface of the side wall portion is smaller than an outer diameter of the cylinder portion excluding the overlapping region, and
an inner diameter of the side wall portion is less than or equal to a maximum value of the outer diameter of the cylinder portion.

6. The battery in accordance with claim 1,
wherein the inner circumferential surface of the side wall portion is bonded to an outer circumferential surface of the cylinder portion.

7. The battery in accordance with claim 6,
wherein a diameter of the inner circumferential surface of the side wall portion at a location where it is bonded to the cylinder portion is less than or equal to a maximum value of a diameter of the outer diameter of the cylinder portion.

8. The battery in accordance with claim 1,
wherein a lower surface of the sealing plate that opposes the bottom portion is coplanar with a surface of the top plate portion that does not oppose the bottom portion, or is positioned on a side of the bottom portion relative to the surface of the top plate portion that does not oppose the bottom portion.

9. The battery in accordance with claim 1,
wherein the cylinder portion is circular cylindrical.

* * * * *